United States Patent
Ball et al.

(10) Patent No.: US 6,596,030 B2
(45) Date of Patent: Jul. 22, 2003

(54) IDENTIFYING CHANGES IN ON-LINE DATA REPOSITORIES

(75) Inventors: Thomas J. Ball, Naperville, IL (US); Frederick Douglis, Somerset, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/077,444

(22) Filed: Feb. 15, 2002

(65) Prior Publication Data

US 2002/0120648 A1 Aug. 29, 2002

Related U.S. Application Data

(63) Continuation of application No. 08/549,359, filed on Oct. 27, 1995, now Pat. No. 6,366,933.

(51) Int. Cl.$^7$ ............................................. G06F 17/00

(52) U.S. Cl. ....................................... 715/511; 715/513

(58) Field of Search ................................ 707/511, 513, 707/501.1, 522, 523, 202, 203, 204; 709/203, 217–219; 715/501.1, 511, 513, 522–523

(56) References Cited

U.S. PATENT DOCUMENTS

| | | | | |
|---|---|---|---|---|
| 4,807,182 A | * | 2/1989 | Queen | 345/781 |
| 4,912,637 A | * | 3/1990 | Sheedy et al. | 707/203 |
| 5,008,853 A | * | 4/1991 | Bly et al. | 345/2.1 |
| 5,278,979 A | * | 1/1994 | Foster et al. | 707/203 |
| 5,325,478 A | * | 6/1994 | Shelton et al. | 707/4 |
| 5,438,661 A | * | 8/1995 | Ogawa | 345/804 |
| 5,535,332 A | * | 7/1996 | Ishida | 709/205 |
| 5,671,428 A | * | 9/1997 | Muranaga et al. | 345/751 |
| 5,752,245 A | * | 5/1998 | Parrish et al. | 707/1 |
| 5,764,972 A | * | 6/1998 | Crouse et al. | 707/1 |
| 5,806,078 A | * | 9/1998 | Hug et al. | 707/203 |
| 5,835,601 A | * | 11/1998 | Shimbo et al. | 380/29 |
| 5,835,911 A | | 11/1998 | Nakagawa et al. | |
| 5,860,071 A | * | 1/1999 | Ball et al. | 707/100 |
| 5,995,097 A | * | 11/1999 | Tokumine et al. | 345/752 |

OTHER PUBLICATIONS

Warren Ernst, "Using Netscape", QUE Corporation, pp. 34, 58–59, 66–71, 90, and 93–95, Mar. 1995.*

Using FrameMaker, Frame Technology Corp., pp. 22–1 to 22–19, Sep. 1993.*

Ball et al, "An Internet Difference Engine and its Applications", Proceedings of COMPCON '96, IEEE, pp. 71–76, Feb. 1996.*

Douglis et al, "Tracking and Viewing Changes on the Web", Proceedings of the 1996 Usenix Technical Conference, The Usenix Association, pp. 165–176, Jan. 1996.*

J–G Lim, "Using Coollists to Index HTML Documents in the Web", Computer Networks and ISDN Systems, vol. 28, pp. 147–154, Dec. 1995.*

Pazzini et al, "Learning from Hotlists and Coldlists: Towards a WWW Information Filtering and Seeking Agent", Proceedings of the International Conference on Tools with Artificial Intelligence, pp. 492–495, Jan. 1995.*

(List continued on next page.)

Primary Examiner—Joseph H. Feild
(74) Attorney, Agent, or Firm—Hoffmann & Baron, LLP

(57) ABSTRACT

A system for accessing documents contained in a remote repository, which change in content from version-to-version. The system allows users to specify lists of documents of interest. Based on the lists, the system maintains an archive, which contains a copy of one version of each listed document, and material from which the other versions can be reconstructed. The system periodically compares the archive with current versions of the documents located in the repository, and updates the archive, thereby maintaining the ability to reconstruct current versions. The system also monitors access to the versions by each user. When a user calls for a current version, the system presents the current version, and indicates what parts of the current version have not been previously accessed by the user.

11 Claims, 18 Drawing Sheets

Microfiche Appendix Included
(1 Microfiche, 52 Pages)

OTHER PUBLICATIONS

Sheth et al, "Evolving Agents for Personalized Information Filtering", Proceedings of the Ninth Conference on Artificial Intelligence for Applications, IEEE Computer Society Press, pp. 345–352, Mar. 1993.*

Branagan L. Sierra M: 'The frame handbook: building FrameMaker documents that work', Sebastopol, California, O'Reilly, 1994 ISBN 1565920090, pp. 388–395.

Warren Ernst, "Using Netscape", QUE Corporation, pp. 34, 58–59, 66–71, 90, and 93–95, Mar. 1995.

*Using Framemaker*, Frame Technology Corp., pp. 22–1 to 22–19, Sep. 1993.

Ball et al, "An Internet Difference Engine and its Applications", Proceedings of COMPCON '96, IEEE, pp. 71–76, Feb. 1996.

Douglis et al, "Tracking and Viewing Changes on the Web", Proceedings of the 1996 Usenix Technical Conference, The Usenix Association, pp. 165–176, Jan. 1996.

J–G. Lim, "Using Coollists to Index HTML Documents in the Web", Computer Networks and ISDN Systems, vol. 28, pp. 147–154, Dec. 1995.

Pazzani et al., "Learning from Hotlists and Coldlists: Towards a WWW Information Filtering and Seeking Agent", Proceedings of the International Conference on Tools with Artificial Intelligence, pp. 492–495, Jan. 1995.

Sheth et al., "Evolving Agents for Personalized Information Filtering", Proceedings of the Ninth Conference on Artificial Intelligence for Applications, IEEE Computer Society Press, pp. 345–352, Mar. 1993.

* cited by examiner

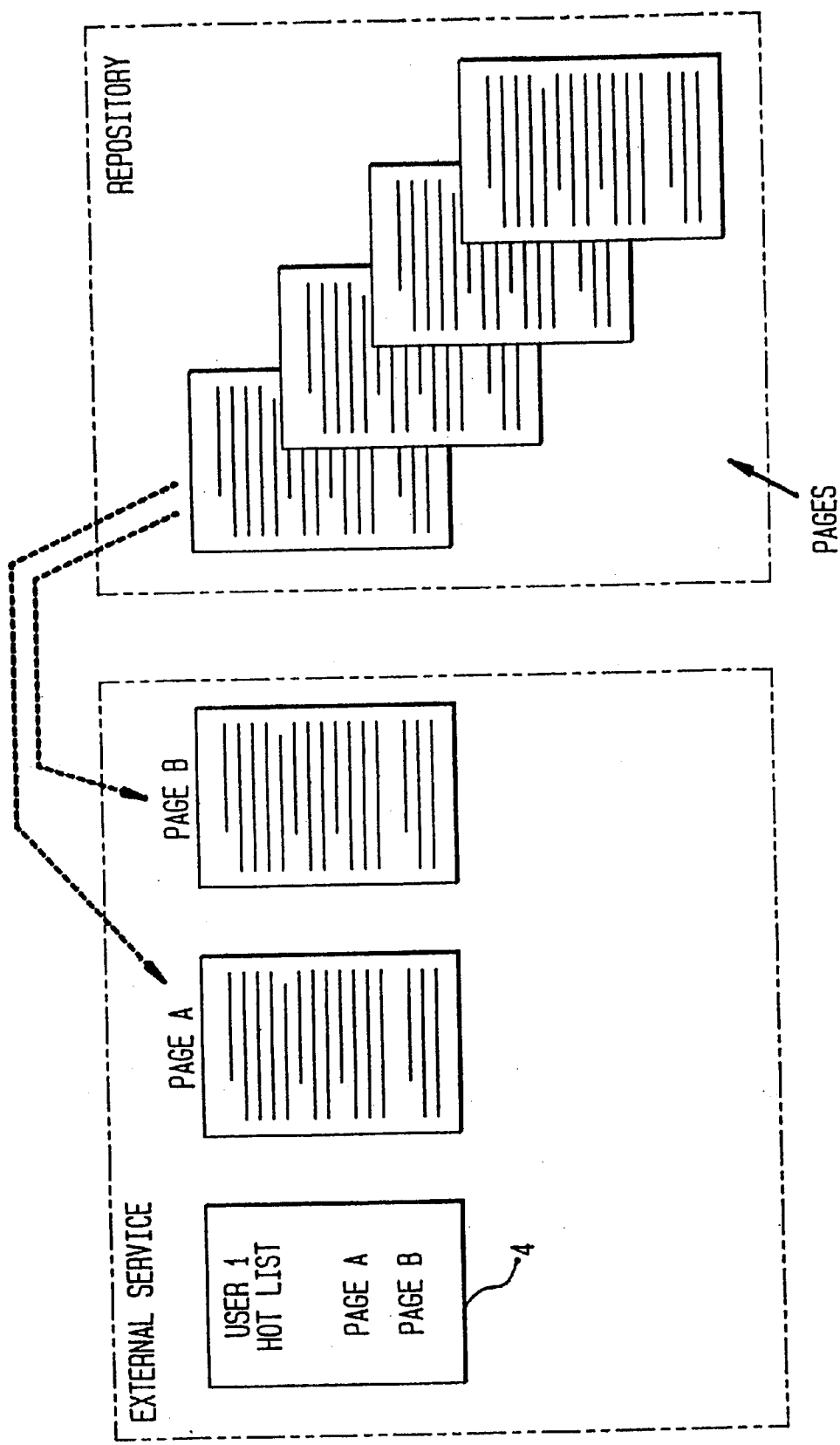

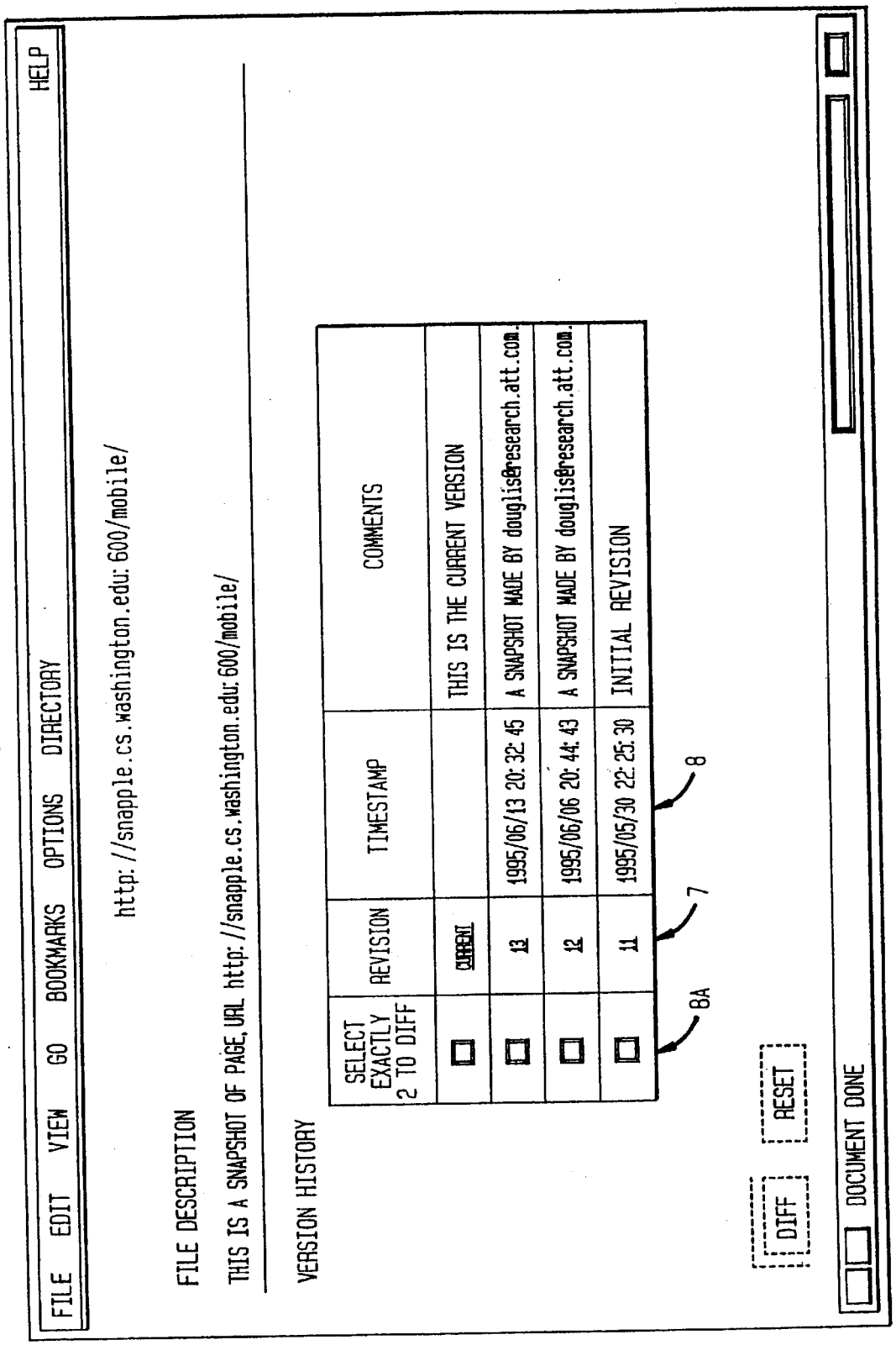

FIG. 3B

FILE  EDIT  VIEW  GO  BOOKMARKS  OPTIONS  DIRECTORY                                                    HELP

THE FOLLOWING URLs HAVE CHANGED:

JUNE 95

- WHAT'S NEW WITH NCSA MOSAIC (FRIDAY, JUNE 23) |REMEMBER DIFF| HISTORY
- FRED DOUGLIS (THURSDAY, JUNE 22) |REMEMBER DIFF| HISTORY
- MAC INTERNET APPLICATIONS (WEDNESDAY, JUNE 21) |REMEMBER DIFF| HISTORY
- PERL5 INFORMATION ANNOUNCEMENTS AND DISCUSSION-P:15,000 (TUESDAY, JUNE 20) |REMEMBER DIFF| HISTORY
- VIRTUAL LIBRARY/CYBERNER: WHATS NEW (SUNDAY, JUNE 18) |REMEMBER DIFF| HISTORY
- VIRTUAL LIBRARY/CYBERNER: WWW DEVELOPMENT (FRIDAY, JUNE 16) |REMEMBER DIFF| HISTORY

THE FOLLOWING URLs WERE CHECKED RECENTLY AND NOT POLLED:

- UNIX AND UNIX UTILITIES FOR THE MACINTOSH |REMEMBER DIFF| HISTORY
- WELCOME TO SPECTOR INC. |REMEMBER DIFF| HISTORY
- USENIX ASSOCIATION HOME PAGE |REMEMBER DIFF| HISTORY

THE FOLLOWING URLs HAVE NOT CHANGED:

JUNE 95

- AT&T BELL LABORATORIES COMPUTING SCIENCE RESEARCH CENTER (THURSDAY, JUNE 15) |REMEMBER DIFF| HISTORY
- THOMAS J. BALL (THURSDAY, JUNE 8) |REMEMBER DIFF| HISTORY
- AN AT&T BELL LABORATORIES RESEARCH WORLD-WIDE WEB SERVER (MONDAY, JUNE 5) |REMEMBER DIFF| HISTORY

DOCUMENT DONE

FIG. 14

| FILE | EDIT | VIEW | GO | BOOKMARKS | OPTIONS | DIRECTORY |

NO HANDS

THIS FORM IS USED TO INTERACT WITH *THE NO HANDS* FACILITY. YOU CAN REMEMBER WHAT A PAGE POINTED TO BY A URL LOOKS LIKE, SO YOU CAN RETURN TO IT LATER AND SEE HOW IT HAS CHANGED. (IN NETSCAPE, YOU CAN ENTER THE URL EASILY BY HOLDING DOWN THE RIGHT BUTTON OVER A LINK AND SELECTING *COPY THIS LINK LOCATION TO CLIPBOARD*. NOTE THAT IN NETSCAPE 1.1N, IF YOU DOUBLE-CLICK ON THE URL IN THE LOCATION LINE OF THE PAGE YOU WANT TO TRACK, WHEN YOU COME BACK TO THIS PAGE AND TRY TO PASTE THE URL NOTHING WILL HAPPEN.) YOU MAY VIEW THE DIFFERENCES BETWEEN THE MOST RECENT VERSION YOU SAW AND THE CURRENT VERSION, OR SEE THE HISTORY OF PAST VERSIONS OF THE PAGE (NOT ONLY THE ONES YOU SAVED AWAY). YOU MAY ALSO SEE ALL URLs YOU HAVE SAVED AWAY, OR SEE INFORMATION ABOUT OTHER USERS OF THE FACILITY.

NOTE THAT CURRENTLY THERE IS NO PROTECTION: ANYONE CAN USE ANY "EMAIL ADDRESS" AND CAN VIEW EACH OTHER'S INFORMATION.

SOME DOCUMENTATION ABOUT THE *NO HANDS* FACILITY AND THIS *FORM* IN PARTICULAR ARE AVAILABLE.

URL: `http://snapple.cs.washington.edu:600/mob`

EMAIL ADDRESS: `ldouglis@research.att.com`

OPERATION: REMEMBER ☐

[SUBMIT QUERY]   [RESET]

IDENTIFYING CHANGES IN ON-LINE DATA REPOSITORIES

This application is a continuation of copending application Ser. No. 08/549,359 filed on Oct. 27, 1995; U.S. Pat. No. 6,366,933B1.

Included in parent application, Ser. No. 08/549,359, and forming part of this specification, is a microfiche appendix, including 1 sheet having a total of 52 frames.

The invention concerns presentation of a current version of a document retrieved from a data repository. The presentation indicates changes made in the document since the viewer accessed a previous version.

BACKGROUND OF THE INVENTION

Information which is stored in computerized systems can change frequently, and without notice. As an example, software under development frequently involves many persons, and is commonly stored at a central location. Each person can change the software on an ad hoc basis, without knowledge of others.

In such systems containing changeable data, a person who examines information on a given day does not, in general, know whether, and how, the information has changed since a previous examination. Consequently, the person must spend time comparing currently available information with previous versions of the information.

Software exists for facilitating this comparison. For example, systems known as "version control systems," or "revision control systems," store data which represents multiple versions of different documents, as indicated in FIG. 1A. In that Figure, the DATA is indicated, together with dashed loops which indicate the VERSIONs.

The loops indicate that the VERSIONs are contained in, and derivable from, the DATA. For example, each VERSION can be stored in its entirety. Alternately, a single VERSION can be stored in its entirety, and other VERSIONs can be stored in the form of differences between them and the single, entire VERSION.

The version control system reconstructs any selected VERSION for the user.

However, many such software systems suffer disadvantages. In general, some systems notify users of the occurrences of changes, but do not identify the changes themselves. Conversely, other systems identify the changes (generically, these systems are known as "diff" systems), but only in response to identification of a particular pair of documents.

SUMMARY OF THE INVENTION

One form of the invention observes a user's examination of a document contained in a repository. The invention then continually monitors that document for modifications. When the user examines the document at a later time, the invention presents the document in the current, later, form, and indicates the modifications occurring since the user last viewed the document.

BRIEF DESCRIPTION OF THE DRAWINGS

FIG. 2 illustrates a hot list, and copying PAGEs from a REPOSITORY to an EXTERNAL SERVICE.

FIG. 3A illustrates a display, generated by the invention, which lists various versions of a PAGE.

FIG. 3B illustrates a display, generated by the invention, which identifies PAGEs contained in a hot list which have changed.

FIG. 14 demonstrates use of a SNAPSHOT facility, which allows a user to specify an operation on a URL. In this example, DOUGLIS@RESEARCH.ATT.COM is "remembering" URL HTTP://SNAPPLE.CS.WASHINGTON.EDU:600/MOBILE/.

DETAILED DESCRIPTION OF THE INVENTION

An illustrative embodiment of the invention is given in the discussion below.

Overview of Invention

A commonly used repository of information is known as the World Wide Web, or WWW. In the WWW, providers of information make their information available to users in the form of "pages." Each page is assigned a name, which distinguishes the page from other pages, and allows a user to locate the page.

The WWW provides information using an information retrieval-and-display approach called "hypertext." In hypertext, a page may contain references to other pages, or other documents. A user can call up a page which is referenced, by clicking on the reference (called a URL, or Universal Resource Locator) with a pointing device. FIG. 1B provides an example.

In FIG. 1B, a document D is displayed to a user. References R refer to other documents. For example, R1 refers to D1, R2 refers to D2, and so on. The referenced documents themselves may contain their own references to other documents, such as R4, which refers to D4.

A user can retrieve a referenced document D, by clicking on the reference R which refers to it. For example, clicking on R1 causes retrieval and display of D1.

Under the invention, a user of the WWW initially identifies pages of interest. Document D in FIG. 1B represents one page. These selected pages form a "hot list". Then, the invention does the following:

(a) Copies the hot-listed pages into an archive, which is a storage location separate from the WWW, and under independent control. After the copying, the original pages continue to reside in the WWW, and copies reside in the archive.

(b) Monitors, at later times, the original pages for changes, and archives the changes.

(c) Records the times when the user later accesses each hot-listed page.

(d) Whenever the user accesses a hot-listed page, presents the user with
  i) the current version of the page (which may differ from the initial copy which was stored in the archive); and
  ii) an option to compare selected versions of the page. The comparison is presented by performing a differencing operation on pairs of versions.

e) As an option, the invention also implements the steps described above with respect to documents referenced by the page. For example, in FIG. 1A, if a user is viewing document D, the invention can present the current version of reference document D2, together with a history of D2.

More Detailed Description

Hot-List Pages are Stored in EXTERNAL SERVICE

Figure 1:
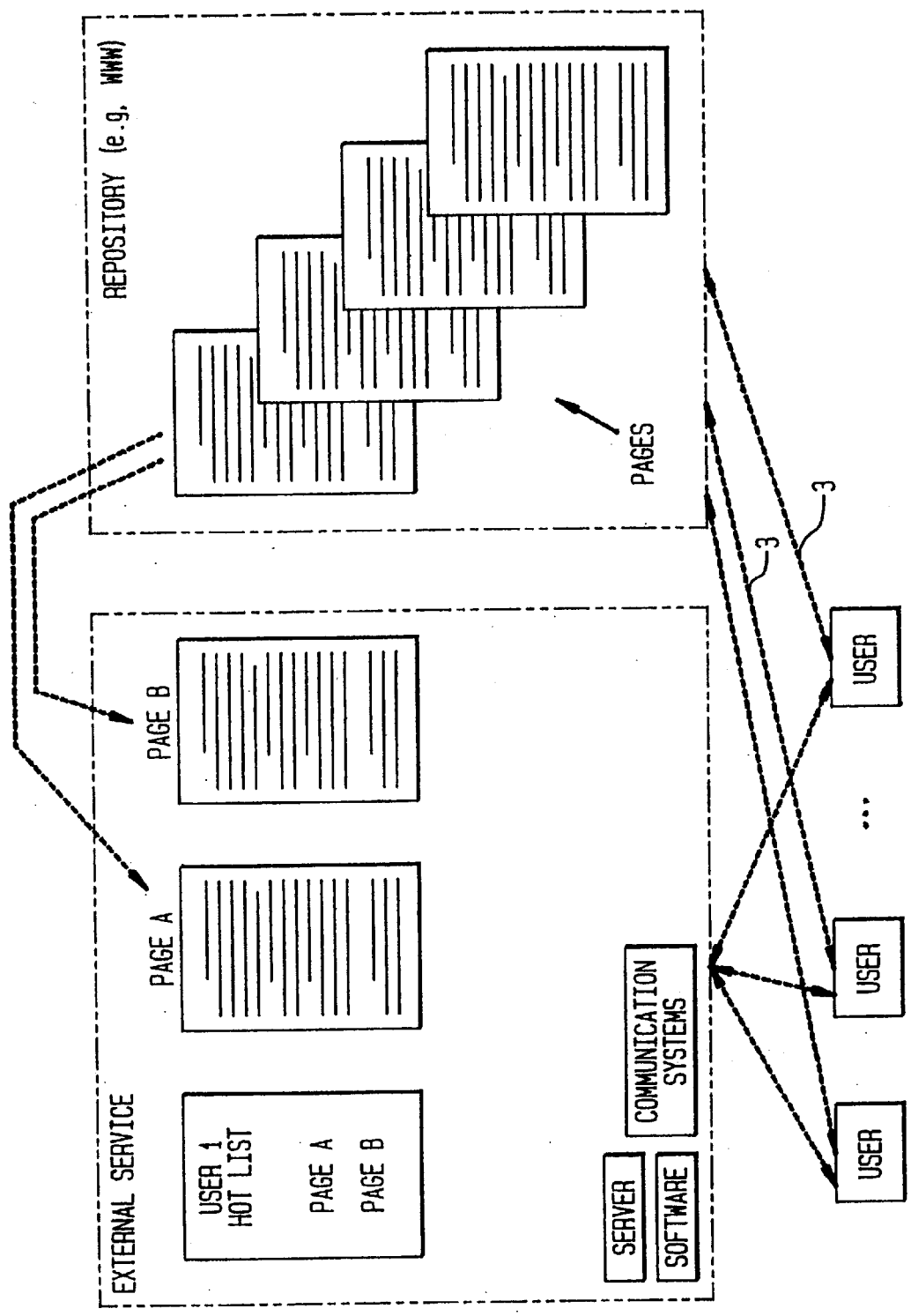
FIG. 1 illustrates an illustrative embodiment of the invention.
Figure 1A:
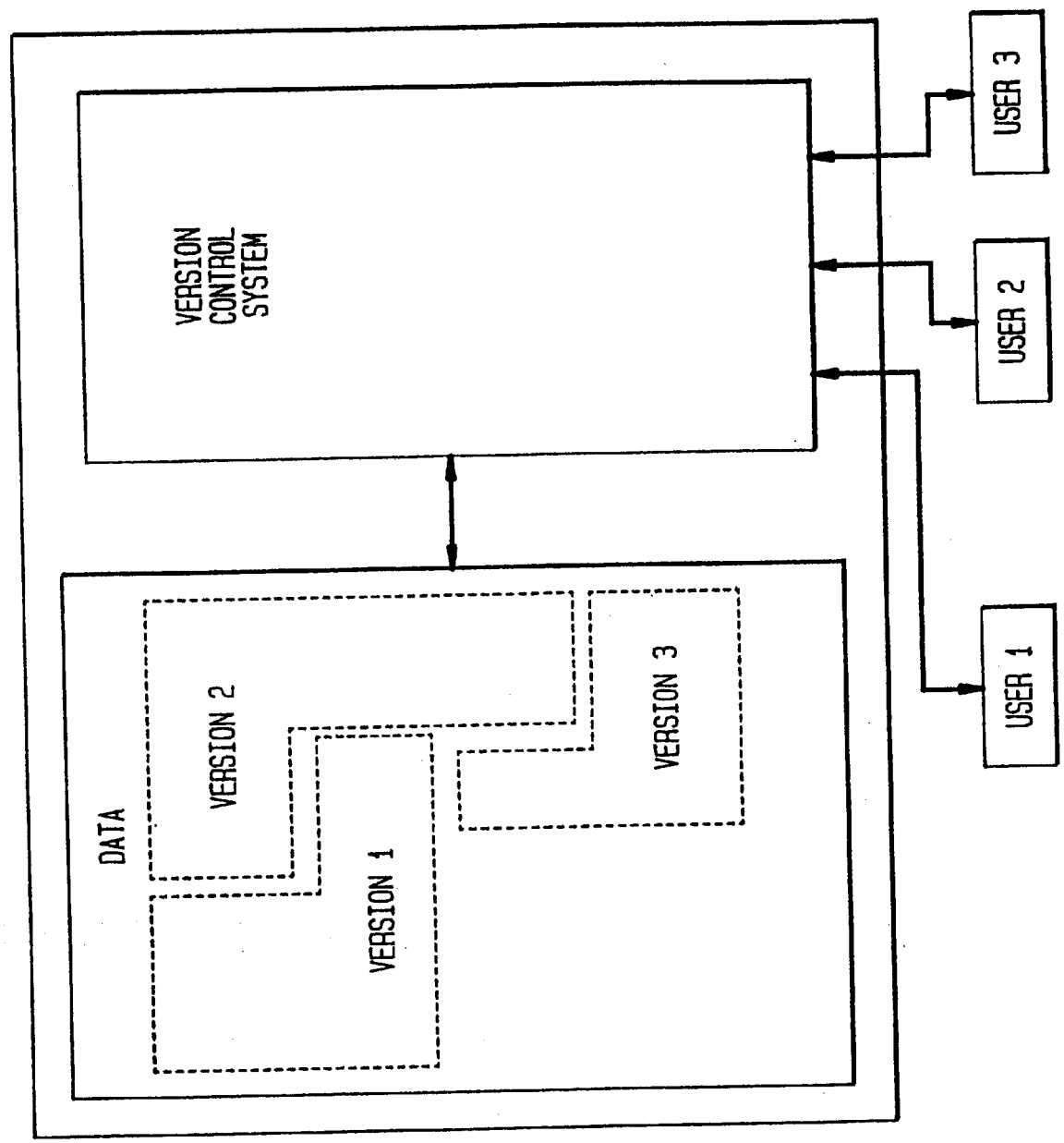
FIG. 1A illustrates a prior-art version control system.
Figure 1B:
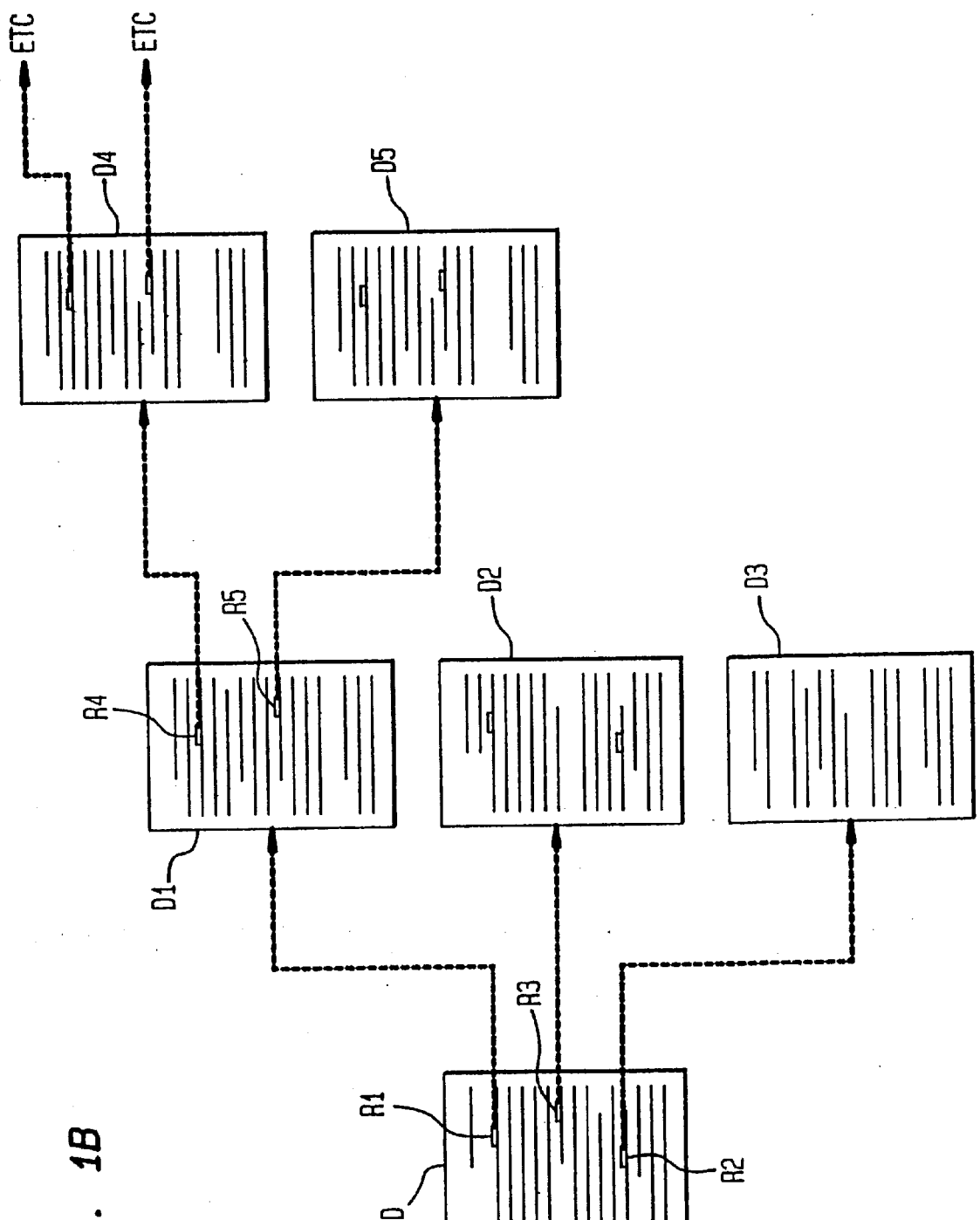
FIG. 1B illustrates selected concepts involved in hypertext information retrieval.

FIG. 1 illustrates a REPOSITORY of information, such as the WWW. For assistance in accessing the REPOSITORY, the invention provides the EXTERNAL SERVICE which includes:

(a) SOFTWARE, such as that provided in the COMPUTER PROGRAM LISTING herein, (b) a SERVER, or other computer, which runs the software, and (c) COMMUNICATION SYSTEMS which link with both the users and the REPOSITORY.

The SERVER and the COMMUNICATION SYSTEMS located within the EXTERNAL SERVICE are known in the art. As indicated in the Figure, the EXTERNAL SERVICE is distinct from the REPOSITORY, and under separate control.

The invention does not disrupt the users' normal interaction with the REPOSITORY; the users can interact with both the REPOSITORY, as usual, and also with the EXTERNAL SERVICE. Dashed arrows 3 indicate the interaction. Several examples will provide illustrative modes of operation of the invention.

Example: Single User

Operation with respect to a single user will first be explained. FIG. 2 shows a hot list 4, submitted by USER 1, which identifies pages A and B as being of interest to USER 1. The invention allows the user to modify the hot list at later times. In response to the hot list, the invention copies pages A and B from the REPOSITORY, as indicated by the dashed arrows. These PAGEs will be termed "base pages." At this time, the originals of PAGEs A and B remain in the REPOSITORY, and copies reside in the EXTERNAL SERVICE.

Then, the invention periodically examines the originals of PAGES A and B, located in the REPOSITORY, for changes. In looking for changes, the invention first performs a preliminary check, based on information such as (1) dates of modification and (2) checksums.

Dates of modification may be added to a PAGE by the PAGE provider. These dates directly indicate whether the originally archived version has changed.

Checksums are generated by the invention. An example of a checksum is the numerical sum of all characters in a line, or on a page. If a checksum changes (indicating that the number of characters has changed), the change indicates a high probability that a change has occurred in the PAGE. (In practice, the checksums used are more complex than this simple example illustrates. Checksums are known in the art.)

If the preliminary check, either by dates of modification or checksums, indicates that changes have occurred, then the invention copies the present version of the PAGE into the EXTERNAL SERVICE, and compares it with the base page, in order to locate the changes. Computer programs for detecting such changes are known in the art, and some examples are given in the TECHNICAL APPENDIX. A preferred program, not known in the prior art, is entitled W3NEWER, and was developed by the inventors. W3NEWER is contained in the listing located at the end of this Specification.

Figure 3:
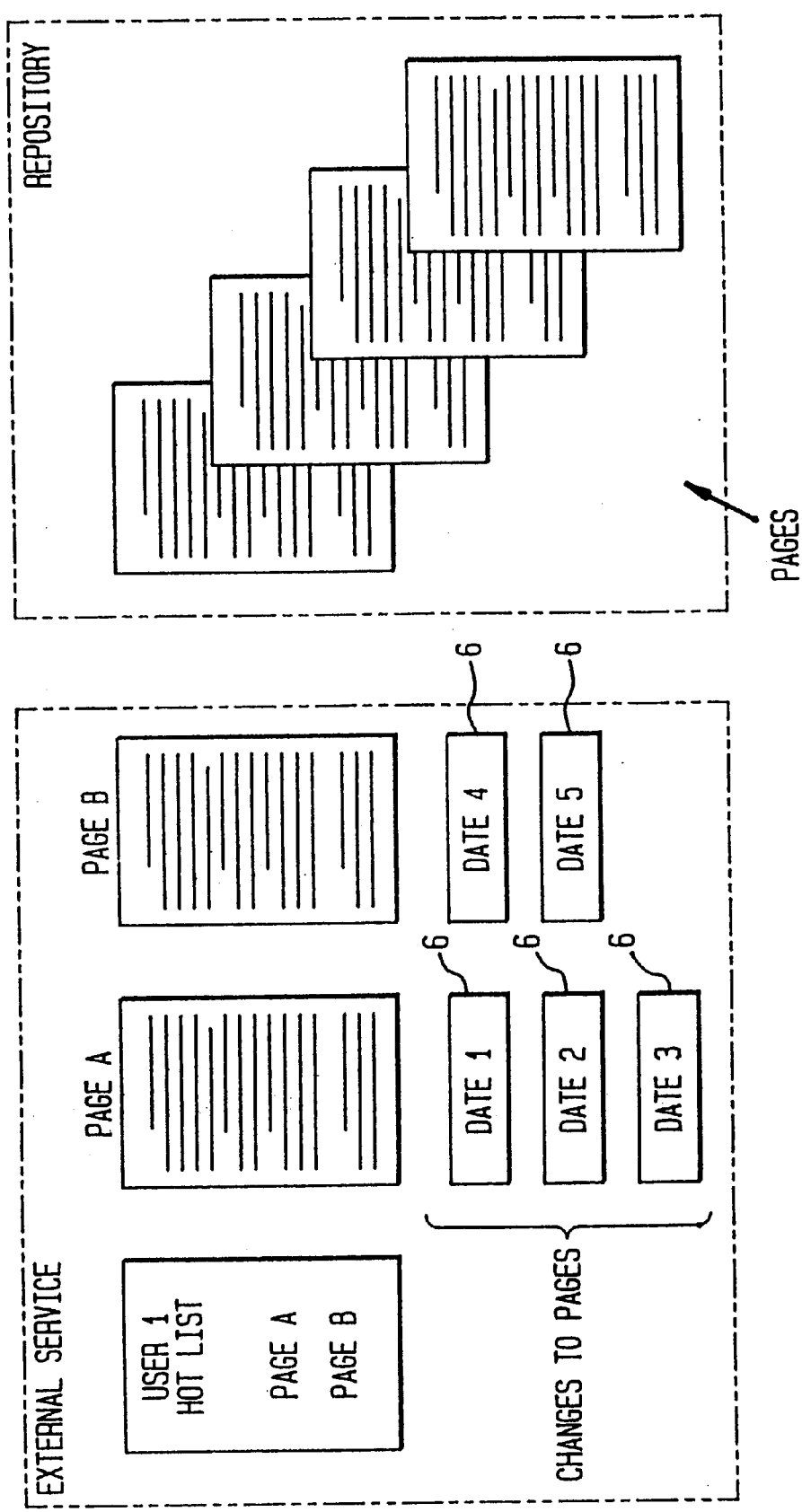
FIG. 3 illustrates an ARCHIVE within the EXTERNAL SERVICE, which contains copies of original versions of PAGEs, and changes made to the original versions.

When changes are found, the invention stores them in the EXTERNAL SERVICE. FIG. 3 illustrates storage of the changes, by the small boxes 6 located below PAGEs A and B. The DATEs within the boxes 6 indicate the dates on which the changes were saved.

FIG. 3A illustrates how the invention displays the history of versions. Column 7 indicates the number assigned to each version by the invention. Column 8 indicates the times when the respective versions were retrieved by the invention. Column 8A allows a user to select a pair of versions for a differencing operation, as discussed below.

For ease of explanation, FIG. 3 illustrates storage of base pages, which are early versions of PAGEs, together with subsequent changes, indicated by the boxes 6. However, in practice, it can be more efficient to perform storage in a reversed sense, by storing the latest version as the base page (instead of the early version) and storing the changes 6 from which early versions can be reconstructed. One reason is that users are expected to call for latest versions more frequently than early versions. Storage of the entire latest versions eliminates the need to reconstruct them.

The changes, together with their base pages, form an archives which allows reconstruction of a PAGE as of any date desired. For example:

PAGE A itself (ie, the base page), plus the changes labeled DATE 1, allow reconstruction of the version of PAGE A, as of DATE 1.

PAGE A itself, plus the changes labeled DATE 1 and DATE 2, allow reconstruction, as of DATE 2, and so on.

When USER 1 wishes to view PAGE A, the invention ordinarily retrieves and presents the current version. The invention also provides an option for reconstructing the PAGE, as of a date specified by the user, and presents it in the format shown in FIG. 4. The program HTMLDIFF, contained in the listing, generates the image shown in FIG. 4. The content of the page can be divided into three classes.

The first class contains material which has not changed. This class of material is displayed in the font, size, color, and background, as customary in documents downloaded from the REPOSITORY.

The second class represents changes, and contains material not present in the base page, but which has been added. Brackets 9 indicate such material. (The brackets 9 are part of FIG. 4, and are not necessarily part of the page generated by the invention.) This material is presented in a particular font, particular size, particular color, and particular background. The choice of these parameters can be varied but, in general, they should be chosen to maximize contrast with the first class of material. In addition to the formatting described immediately above, the added material is further highlighted by arrows 7.

The third class contains material which was deleted from the base page. Deleted material can be handled in at least three ways. One, deleted material can be simply deleted, so that the page presented to the reader contains no reference to the deleted material.

Two, the deleted material can be deleted, but a reference indicating the deletion is added, such as the phrase "Deleted material occurs here." In this case, the user can be given the option of fetching the deleted, non-visible, material.

Three, deleted material can be presented, but indicated as deleted, as by "redline" format, in which a horizontal line, perhaps red in color, is drawn through the deleted material.

FIG. 3B illustrates a display, generated by the invention, which indicates which PAGEs on a user's hot list have undergone changes.

Second Example: Multiple Users

In actual practice, multiple users are expected to use the invention. Each of them submits a hot list. In one approach of the invention, the procedure undertaken for a single user (described above) is repeated for multiple users: all PAGEs, on all hot lists, are copied into the EXTERNAL SERVICE. Then, for each hot list, the originals of the PAGES, located within the REPOSITORY, are monitored for changes, and the changes are retrieved into the EXTERNAL SERVICE, as described above.

However, this approach contains inefficiencies. For example, a given PAGE will probably be identified by more than one hot list. Repeatedly copying that PAGE, for each hot list, would entail storage of multiple copies of the same PAGE. Further, repeatedly comparing the multiple copies with their originals in the REPOSITORY represents a waste of computer time: a single comparison would suffice. The invention reduces these inefficiencies by the approach shown in FIG. 5.

Figure 4:
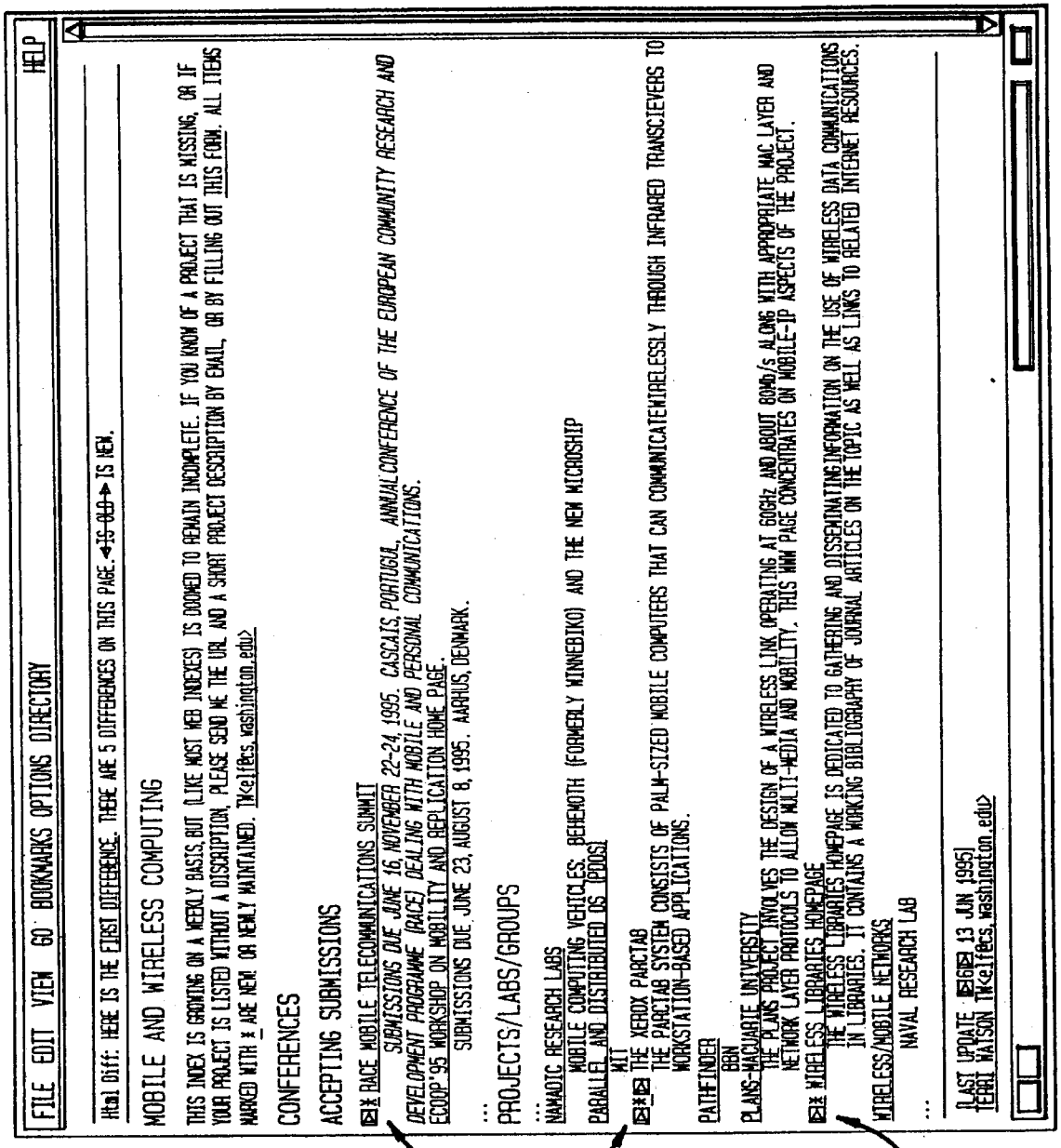
FIG. 4 illustrates a current version of a PAGE, presented in a format which points out changes made since a previous version.

This Figure represents a modification of FIG. 4, to which a hot list for USER 2 has been added. The added hot list specifies PAGES A and C.

To process the new hot list, the invention first checks whether the PAGEs identified on the added hot list are archived within the EXTERNAL SERVICE. Since PAGE A, plus its changes, are already contained within the archive, that PAGE is not copied. But PAGE C, which is not present in the ARCHIVE, is archived, as indicated by the dashed arrow.

At this time, all PAGEs identified on all hot lists are contained within the archive. To emphasize this fact, PAGE A is indicated twice: once for USER 1, and a second time by a dashed page 14, for USER 2, although, as stated above, PAGE A is stored only once.

After archiving all necessary PAGES, the originals, located within the REPOSITORY, are periodically monitored for changes, as described above. The changes are copied to the archive of the EXTERNAL SERVICE.

Flow Chart

Figure 6:
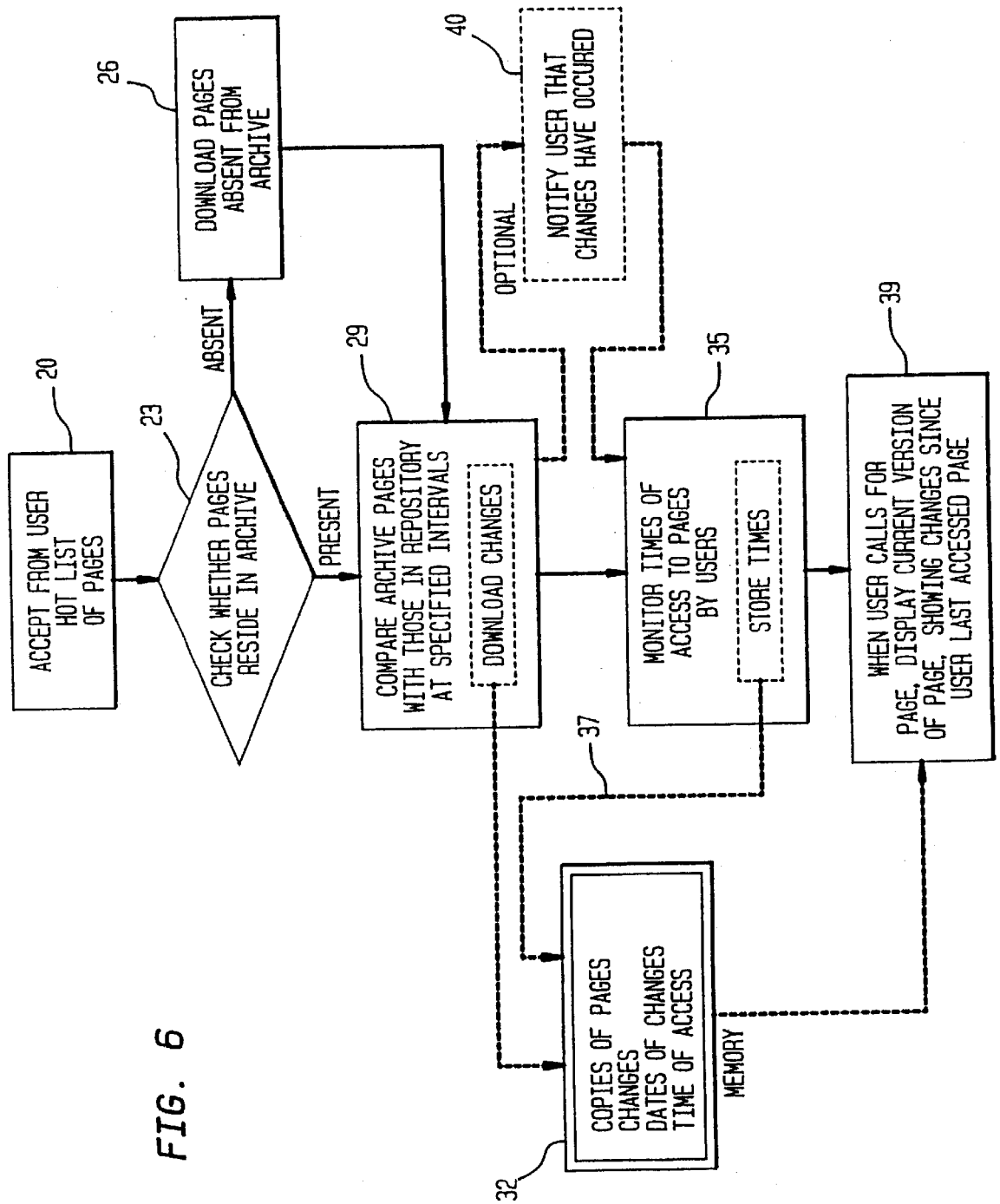
FIG. 6 is a flow chart illustrating logic implemented by one form of the invention.

An exemplary flow chart is shown in FIG. 6, which refers to a single-user case. In block 20, the EXTERNAL SERVICE accepts hot lists from users. Then, in block 23, the EXTERNAL SERVICE checks whether the PAGEs identified on the hot lists are contained within the archive. If not, the PAGEs are copied from the REPOSITORY, as indicated by block 26.

Then the logic proceeds to block 29, where the originals of the PAGEs, located in the REPOSITORY, are examined for changes. The examination can include the preliminary checks (for checksums and dates of modification) discussed above. When changes are found, the entire PAGE containing them is downloaded to the EXTERNAL SERVICE, and the changes, indicated by blocks 6 in FIG. 3, are derived. Block 32 indicates relevant information stored in the EXTERNAL SERVICE.

As users access the PAGEs, block 35 monitors the times of the accesses, in order to identify which versions of each PAGE the user viewed last. These times are stored, as indicated by block 32 and dashed arrow 37. These times are used to determine which changes in FIG. 4 are to be identified as new material, when a PAGE is called by each user. An example will illustrate.

Figure 7:
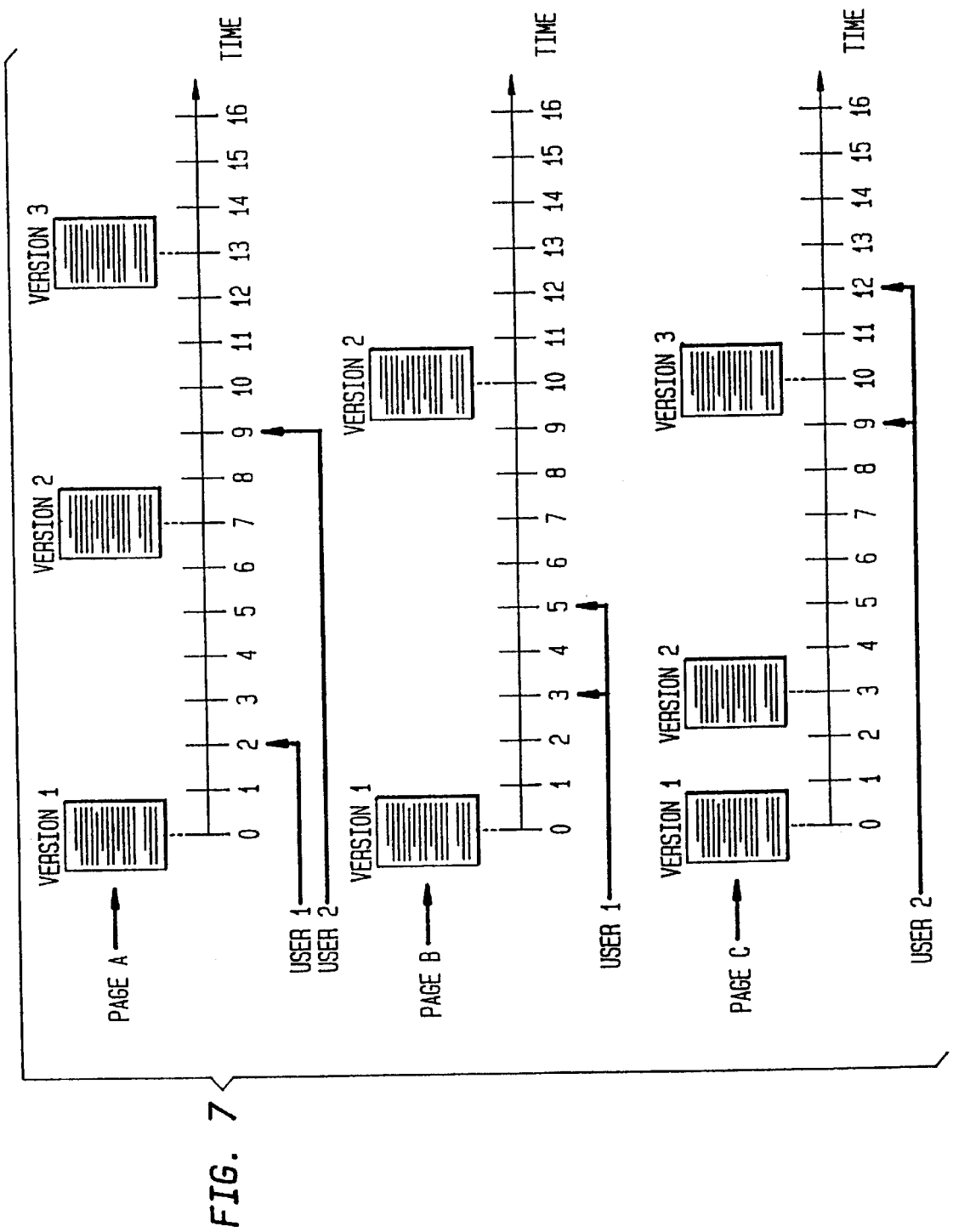
FIG. 7 is a time-history of three PAGEs.

FIG. 7, top, illustrates the time-history of changes made to PAGE A. USER 1 accessed this PAGE at time 2, as indicated. Block 35 in FIG. 6 monitors and records this time (at TIME 2 in FIG. 7, and not earlier, of course).

If USER 1 again accesses the PAGE at time 5, then the invention presents VERSION 1 to the USER. However, if the user accesses the PAGE at time 11, VERSION 2 had been created since the last access by USER 1. The invention had previously identified the changes, and copied them as indicated in FIG. 3. Now, at the access at time 11, the invention presents VERSION 1, plus the changes which make VERSION 2, because block 35 in FIG. 6 indicates that the USER has not seen VERSION 2.

Returning to the flow chart of FIG. 6, block 39 indicates that, when a USER calls for a PAGE, the invention presents the current version, and indicates the changes made (as in FIG. 4) since the USER last accessed that page. In the example immediately above, the invention presents VERSION 2 of PAGE A, as in FIG. 7, and indicates the changes made since VERSION 1, because VERSION 1 was the last accessed by USER 1.

The flow chart of FIG. 6 should not be read as limiting the invention to a linear, sequential mode of operation. In practice, multiple users can present hot lists simultaneously, and other operations shown in the flow chart can also occur together.

Third Example: Notification of Changes

The invention can notify USERs when changes in their hot-listed PAGEs occur, as indicated by the dashed block 40 in FIG. 6. This notification can take the form of a flag which is associated with the BASE PAGE in FIG. 8. When the USER logs into the EXTERNAL SERVICE, the invention notifies the USER of the changes to the respective PAGEs. FIG. 3B illustrates one approach to identifying PAGEs which have changed.

Other types of notification are possible. For example, the invention need not wait for a user to access a PAGE. The invention can notify the user when changes have been found, as by sending an electronic mail message to the user.

Fourth Example: Common Hot List

The invention can maintain a predetermined hot-list, for a community of users. This hot list contains a list of PAGEs which are considered to be of general interest to the community. This hot list, and the PAGEs identified on it, are made publicly available, to all users, but on a read-only basis. Users cannot modify the hot list, or the pages.

This predetermined hot list can serve as an instructional tool, to educate users in the operation of the invention, and to demonstrate desirable features.

One Architecture of Data Storage

Figure 8:
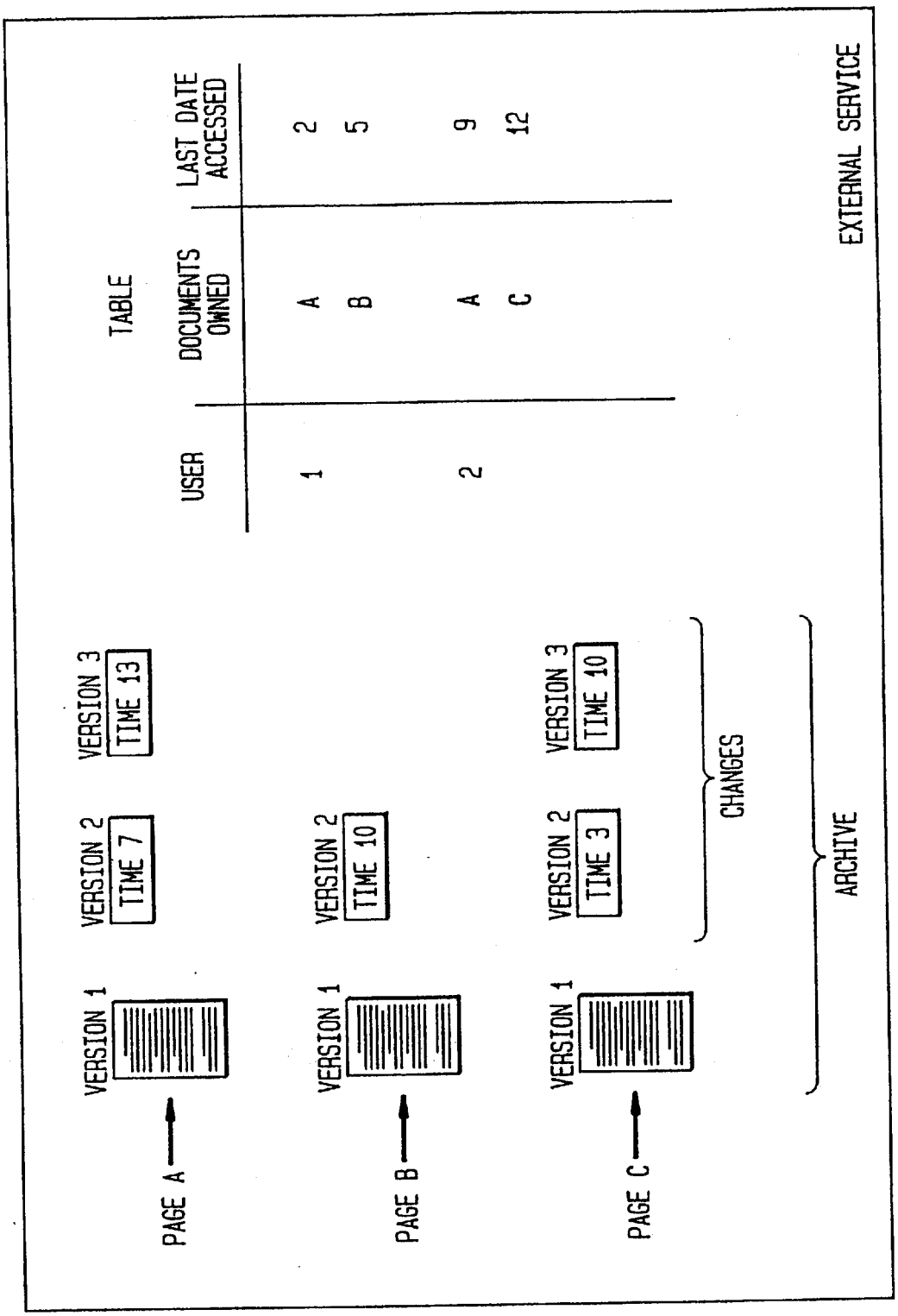
FIG. 8 is an architecture for part of one type of EXTERNAL SERVICE.

An illustrative approach to storage of the information identified in block 32 of the flow chart of FIG. 6 is illustrated in FIG. 8, which is explained with reference to FIG. 7.

Figure 5:
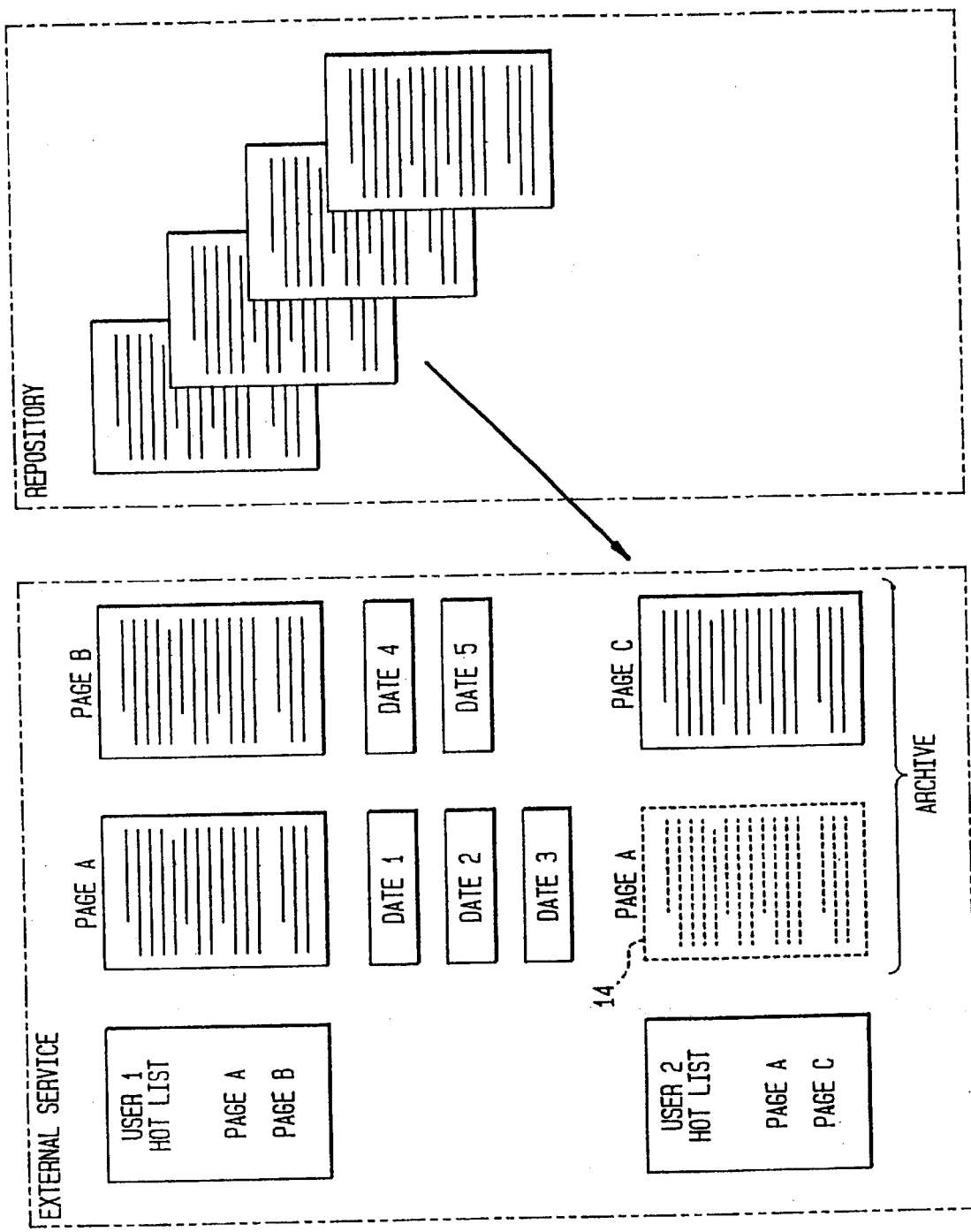
FIG. 5 illustrates hot lists for two users, as compared to a single user as in FIG. 2.

FIG. 7 illustrates hypothetical changes to the three PAGEs identified by the two hot lists of FIG. 5. PAGE A underwent changes at times 7 and 13. Page B underwent changes at time 10, and so on.

In FIG. 8, the arrows extending from the symbols "USER 1", etc., indicate the times of access by the users. For example, USER 1 accessed PAGE A, VERSION 1, at time 2. USER 1 then accessed PAGE A, VERSION 2, at time 9, and so on.

The invention maintains a TABLE of these times, as indicated on the right side of FIG. 8, together with a list of PAGEs, or documents, owned by each USER. Ownership is determined by the hot lists. The invention also maintains (a) the BASE PAGES, (b) the changes to each, and (c) the times of each change, as indicated on the left side of the Figure. From this data, the invention is able to reconstruct any PAGE, as of any date subsequent to the date of the BASE PAGE.

Additional Considerations

1. One definition of "page" is that it refers to a unit of data, stored in a system, which is identified by a specific name. (In the WWW, all pages have unique names.) Other terms can refer to such units of data, such as "files" and "documents." In general, the particular name used will depend on the system storing the data.

2. One definition of "repository" is a collection of data, which is accessible by computer. The repository may be available to the public, or access may be limited. In general, repositories are expected to be distributed, meaning that the storage locations are physically distributed over a wide geographic area, and linked together by a communication system.

3. It was stated above that the invention can reconstruct a page as of any selected date. The reconstruction is based on the changes 6 in FIG. 3. These changes are detected periodically, and the periodicity is determined by each user of the system, subject to limits imposed by the designer and system administrator.

For example, user A can specify a period of one day for checking for changes in the pages on user A's hot list; user B can specify a different period for B's pages, such as one week. The system administrator can specify that no period, for any user, can be shorter than one hour.

Consequently, changes in a page, located in the REPOSITORY, will only appear in a reconstruction done by the EXTERNAL SERVICE after the changes have been detected, and not earlier. An example will illustrate this distinction.

Assume that the invention looks for changes on odd-numbered dates. Thus, a change occurring on the fourth of a month will be detected on the fifth. However, if a user happens to call for reconstruction on the fourth, the change occurring on the fourth will not appear in the reconstruction. Only changes occurring as of the prior detection, namely, as of the third, will appear.

It is expected that the detection process will be performed sufficiently often that the influence of this factor will be negligible.

4. The invention can extend its differencing function (ie, the examination of pages for changes) to pages referenced by the page accessed by the user. For example, if the user accesses document D in FIG. 1B, the invention can detect changes in all documents referenced by document D, such as D1, D2, and D3.

In another embodiment, the differencing can extend to the documents which are, in turn, referenced by the referenced documents. For example, the referenced documents (D1, D2, and D3) refer to D5 and D6. These latter documents (D5 and D6) can be differenced also, as can be the documents which they reference, and so on.

5. The invention provides all information from which a current version of a PAGE may be derived. FIG. 4 gives an example. FIG. 4 contains all such information, together with other information which indicates changes since a previous version.

6. The discussion above presumed that comparison, or differencing, between different versions of a PAGE was done within the EXTERNAL SERVICE. This is not strictly necessary; the comparison can be done at any convenient location. Further, the preliminary checking for the existence of changes can be done at any convenient location.

7. In data storage systems, names are given to the units of information (e.g., documents, pages, records), although the names can be different in different databases. However, the names of the units, in general, remain the same throughout time, despite changes which are made to the information contained in the unit. Therefore, one definition of the term "version" refers to a unit of information, which is different from a previous unit of the same name.

8. The REPOSITORY in FIG. 1 is, in general, located remotely from the EXTERNAL SERVICE. Communication is undertaken by any convenient approach, such as a public-access communication network known as the INTERNET.

In general, the REPOSITORY is under independent control of the EXTERNAL SERVICE. One ramification of this independent control is that the type of processing done to the PAGEs copied into the EXTERNAL SERVICE is controlled by the EXTERNAL SERVICE, and not by the REPOSITORY. For example, (a) the particular processes used in locating and storing differences, (b) the frequency of processing, and (c) the mode of notifying a user, are controlled by the designer of the EXTERNAL SERVICE. The operator of the REPOSITORY has no involvement in this processing.

Figure 9:
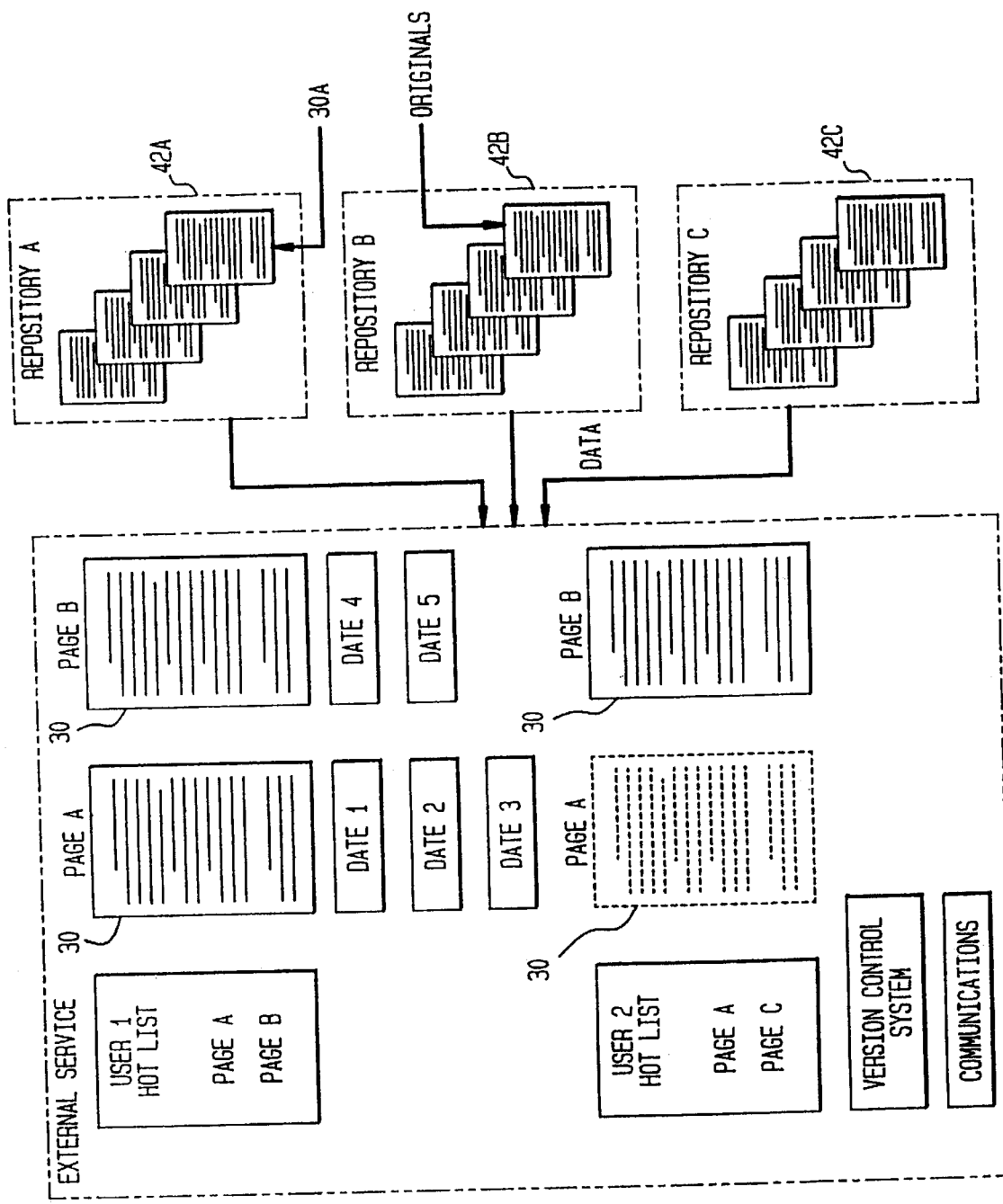
FIG. 9 illustrates one form of the invention.

9. FIG. 9 illustrates another form of the invention. The invention maintains base pages 30 within the EXTERNAL SERVICE, as required by the hot lists 36. The base pages 30 were downloaded from respective repositories 42A, 42B, etc.

The invention periodically monitors the originals 30A of the pages, located in the repository 42, for changes, and stores the changes within the EXTERNAL SERVICE. The invention notifies users when changes are found in pages on their hot lists (notification is not shown).

A version control system 39 allows users to fetch and view any version of any page.

10. The different versions of documents may contain drawings, files from which sound may be generated, files which produce video clips and animation, and other components which do not consist strictly of alphanumeric characters. The invention detects the existence of changes in such components, and marks the existence of the changes, in the display as shown in FIG. 4, without necessarily identifying in detail the nature of the changes.

Figure 10:
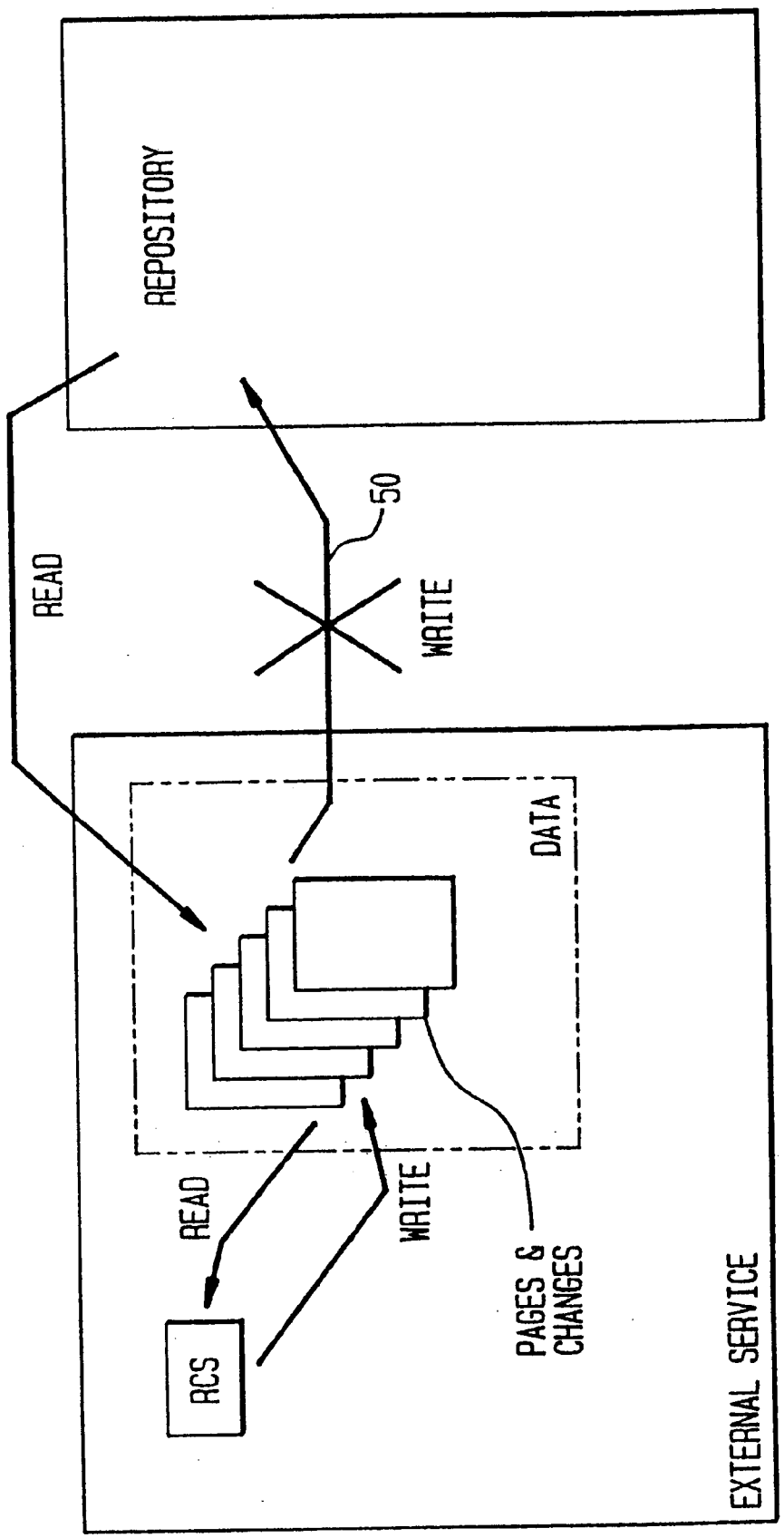
FIG. 10 illustrates one form of the invention.
Figure 11:
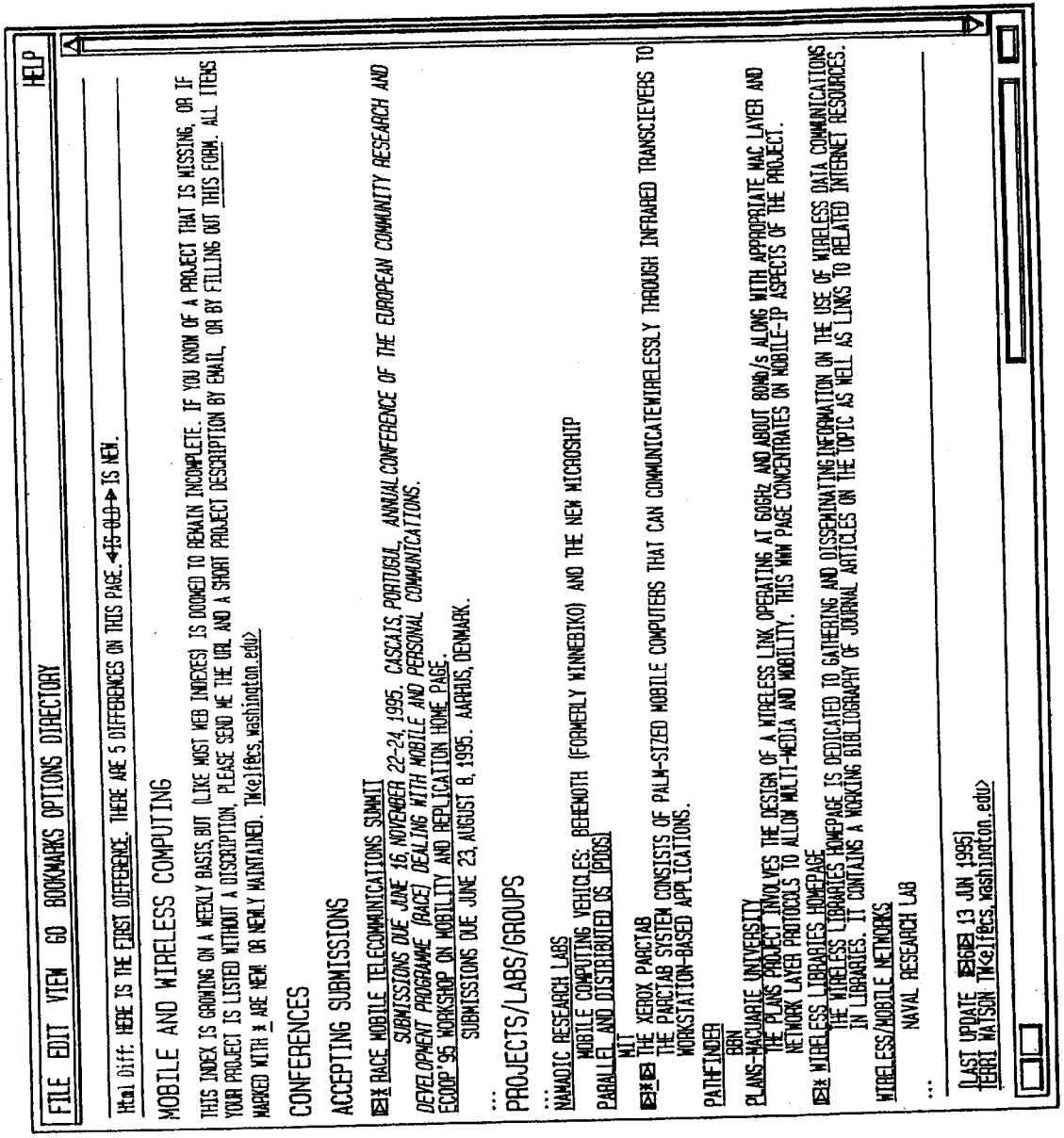
FIG. 11 illustrates output of HTMLDIFF, showing differences between a subset of two versions of HTTP://SNAPPLE.CS.WASHINGTON.EDU.600/MOBILE/. The original HTML source was edited manually to make the result fit onto one page; in practice, the highlighted changes would be interspersed among a much larger document. Small arrows point to changes, which are primarily additions in this case. The change in the "last update" date give an example of text being replaced. Here the page's author had highlighted the changes manually with small icons as well. The banner at the top of the page was inserted by HTMLDIFF.
Figure 12:
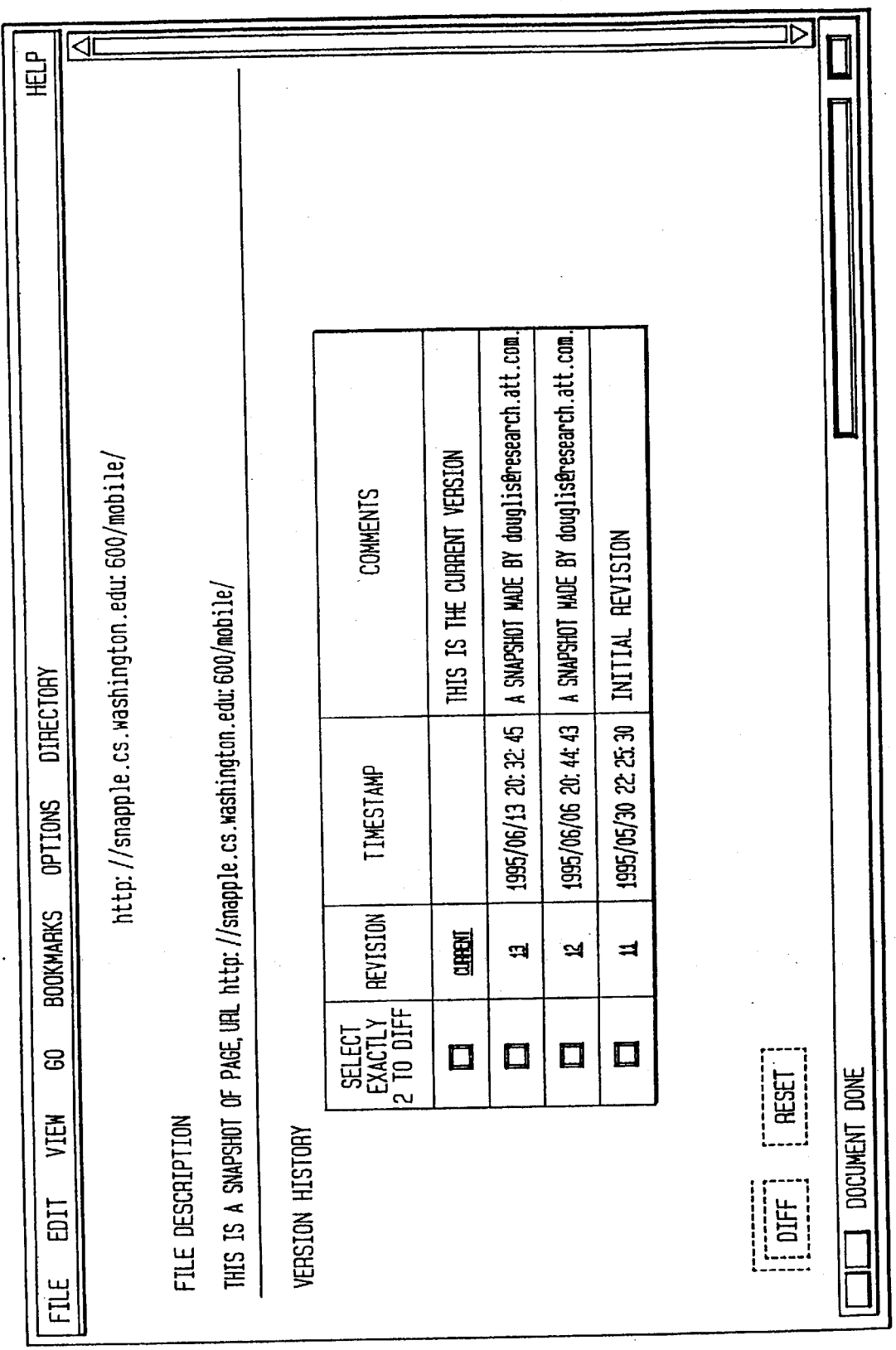
FIG. 12 illustrates version histories which give the user a chance to compare any two versions, or to go directly to a selected version.
Figure 13:
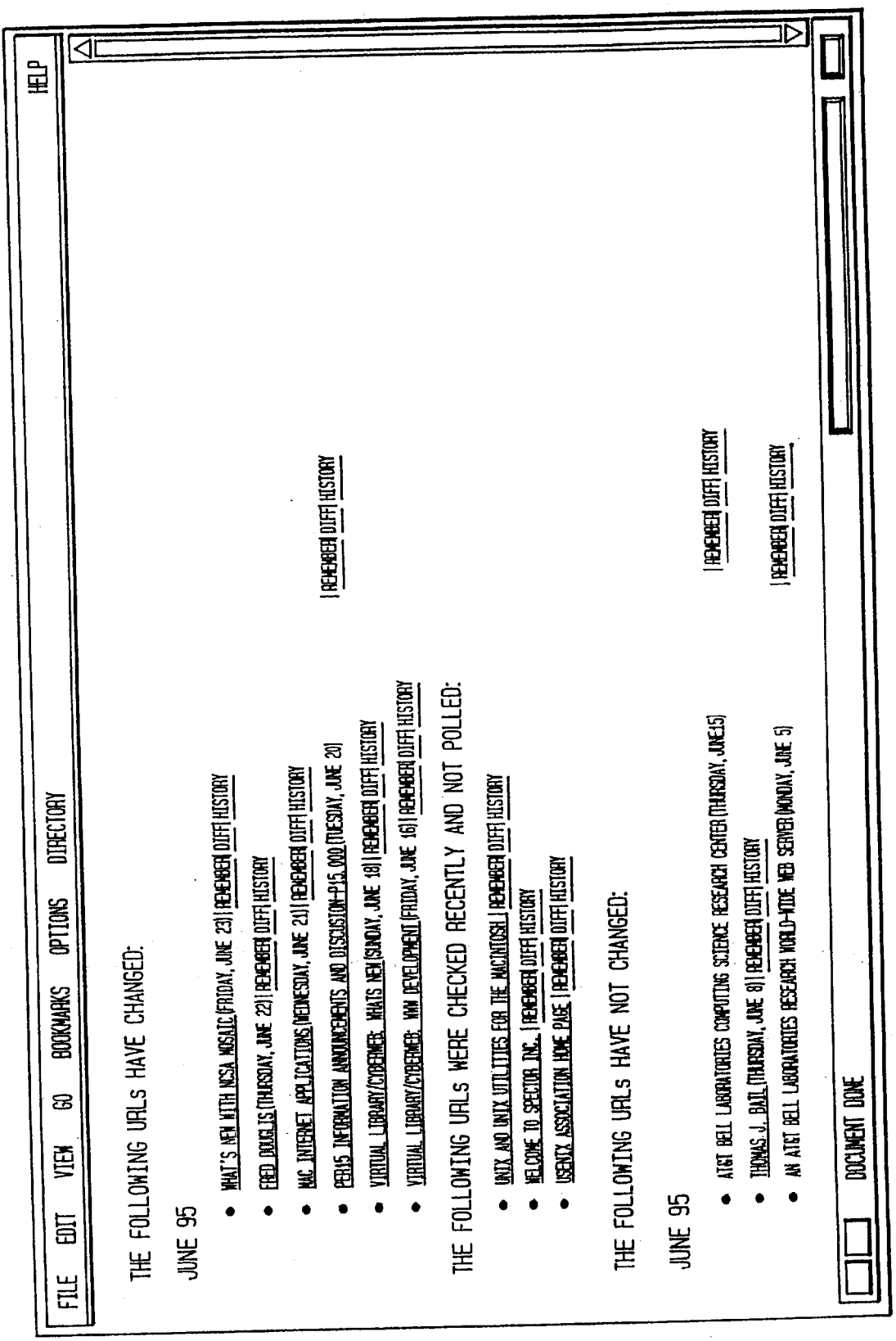
FIG. 13 illustrates output of W3NEWER, and shows a number of anchors (the descriptive text originates from the hot list). The anchors marked "changed" have modification dates after the time which the user's browser history indicates the URL was last seen. Some URLs were not checked at all, and others were checked and are known to have been seen by the user.

11. A primary use of the invention is envisioned in the situation shown in FIG. 10. The EXTERNAL SERVICE obtains copies of PAGEs from a REPOSITORY, such as WWW. However, the EXTERNAL SERVICE is given no authority to replace or modify the pages contained in the REPOSITORY. To the EXTERNAL SERVICE, the PAGEs represent read-only data, as indicated by the "X" over arrow 50, which indicates a write operation.

The EXTERNAL SERVICE performs differencing between currently copied versions of pages, and DATA representing previous versions. The DATA stored in the EXTERNAL SERVICE can be both read, and written to, by the EXTERNAL SERVICE. The EXTERNAL SERVICE reconstructs any version on demand, and also indicates differences between any two versions selected by a user, as discussed above. These functions can be accomplished by a prior-art Revision Control System, RCS (also called a Version Control System), or by the code contained in the listing contained in this Specification.

12. In one form of the invention, the PAGEs retrieved are written in a "markup language," such as HyperText Mark-up Language (HTML). A mark-up language, in general, contains two types of codes, interspersed among the actual text of a document.

One type indicates how the PAGEs are to be displayed. For example, some codes indicate paragraph indentation, other codes indicate font styles, yet other codes indicate style of font, within a font, such as italicizing, underlining, double-striking, or bold printing. This type of code is referred to as format-defining.

A second type of code can identify an image, such as a bit-mapped file located elsewhere. When such a code is read by the system displaying the PAGE, a copy of the image is retrieved, and displayed within the PAGE, at the location specified by the code. This type of code is referred to as content-defining.

The invention does not treat changes in the format-defining codes as changes in content. Thus, a PAGE which changes in layout, or typestyle, only, is not designated as a changed page.

The differencing program contained in the COMPUTER PROGRAM LISTING compares different versions on a subunit-by-subunit basis. For example, the program compares corresponding sentences in different versions, and the sentences are detected by sentence terminators. (Longer subunits can be used, such as paragraphs or pages.) The sentence terminators are a subset of the markup language. Specifically, the terminators are format-defining codes.

Computer Program Listing

The program listing is divided into three sections.

1. HTMLDIFF, comprising:
   html_diff.sml (5 pages),
   diff.sml (3 pages),
   mlweb.sml (4 pages), and
   html.lex (one page).
2. W3NEWER (17 pages).
3. NOHANDS, comprising:
   nohandsBE (11 pages),
   no-hands.cgi (3 pages),
   rcsdiff.cgo (4 pages), and
   snapshot.cgi (3 pages).

NOHANDS is an overall program set which utilizes W3NEWER and HTMLDIFF.

A set of tools that detect when World-Wide-Web pages have been modified and present the modifications visually to the user through marked-up HTML. The tools consist of three components: w3newer, which detects changes to pages; snapshot, which permits a user to store a copy of an arbitrary Web page and to compare any subsequent version of a page with the saved version; and htmldiff, which marks up HTML text to indicate how it has changed from a previous version. The tools are referred to collectively as the Network-Oriented HTML Archival, Notification, and Differencing System (No HANDS). Presented are several aspects of NO HANDS, with an emphasis on systems issues such as scalability, security, and error conditions.

Use of the World-Wide-Web ($W^3$) has increased dramatically over the past couple of years, both in the volume of traffic and the variety of users and content providers. The $W^3$ has become an information distribution medium for academic environments (its original motivation), commercial ones, and virtual communities of people who share interests in a wide variety of topics. Information that used to be sent out over electronic mail or USENET, both active media that go to users who have subscribed to mailing lists or newsgroups, can now be posted on a $W^3$ page. Users interested in that data then visit the page to get the new information.

The URLs of pages of interest to a user can be saved in a "hotlist" (known as a bookmark file in Netscape™), so they can be visited conveniently. How does a user find out when pages have changed? If users know that pages contain up-to-the-minute data (such as stock quotes), or are frequently changed by their owners, they may visit the pages often. Other pages may be ignored, or browsed by the user only to find they have not changed.

In recent months, several tools have become available to address the problem of determining when a page has changed. One example of such a tool is webwatch, a product for Windows™ that uses the HTTP HEAD command to find out when a page has been modified since it was last viewed by a user's web browser, and generates a report in HTML that allows the user to go directly to those updated pages. Another example is w3new, by Brooks Cutter, a public-domain perl script that runs on UNIX® as shown in "B. B. Cutter III. w3new. http://www.stuff.com/bcutter/programs/w3new/w3new.html".

Each of these tools suffers from a significant deficiency: while they provide the user with the knowledge that the page has changed, they do not show how the page has changed. Although a few pages are edited by their maintainers to highlight the most recent changes, often the modifications are not prominent, especially if the pages are large. Even pages with special highlighting of recent changes are problematic: if a user visits a page frequently, what is "new" to the maintainer may not be "new" to the user. Alternatively, a user who visits a page infrequently may miss changes that the maintainer deems to be old.

A system has been developed that efficiently tracks when pages change, compactly stores versions on a per-user basis, and automatically compares and presents the differences between pages. NO HANDS (Network-Oriented HTML Archival, Notification, and Differencing System) provides "personalized" views of versions of $W^3$ pages with three tools. The first, w3newer, is a more scalable version of Cutters w3new modification tracking tool that periodically accesses the $W^3$ to find when pages on a user's hotlist have changed. The second, snapshot, allows a user to save versions of a page end later use a third tool, htmldiff to see how it has changed. Htmldiff automatically compares two HTML pages end creates a "merged" page to show the differences with special HTML markups.

While NO HANDS can help arbitrary users track pages of interest, it can be of particular use in a collaborative environment. Consider a software development project that is geographically distributed across several locations. The $W^3$ can be used to collect requirements, meeting notes, code, documentation, bug reports, and so on, so that everyone involved with the project has a consistent and up-to-date view of the project. As documents change, each project member will want to know what's "new" in their world, without having to waste time browsing documents. The w3newer component of NO HANDS automatically provides this information. Furthermore, what is "new" to one project member will be "old" to another, so that the notion of a document version must be "personalized" rather than global to the entire project. NO HANDS supports personalized versioning of documents with snapshot and uses htmldiff to provide a personalized version of "what's new" in a document.

There has been a great deal of interest lately in finding out when pages on the $W^3$ have changed. Discussed below is related work, issues of scalability and cache consistency, and how to handle possible error conditions.

Two tools, webwatch for Windows and w3new for UNIX, were mentioned above. Another similar tool is shown in "M. Newbery.Katipo. http://www.vuw.ac.nz./newbery/Katipo.html", which runs on the Macintosh™, and yet another, URL-minder as shown in "Url-minder, http://www.netmind.com/URL-minder/URL-minder.html", which runs as a service on the $W^3$ itself and sends email when a page changes. Those that run on the user's host use the "hotlist" to determine which URLs to check, while URL-minder acts on URLs provided explicitly by a user via an HTML form.

There are two basic strategies for deciding when a page has changed. Most tools use the HTTP HEAD command to retrieve the Last-Modified field from a $W^3$ document, either returning a sorted list of all modification times or just those times that are different from the browser's history (the timestamp of the version the user presumably last saw). URL-minder uses a checksum of the content of a page, so it can detect changes in pages that do not provide a Last-Modified date, such as output from Common Gateway Interface (CGI) scripts. W3new (and therefore w3newer) requests the Last-Modified date if available; otherwise, it retrieves and checksums the whole page. Changes are generally reported to the user in the form of an HTML page with links to each of the pages being tracked, although it can also be done via email as with URL-minder.

These tools also vary with respect to frequency of checking and where the checks are performed. Most of the tools automatically run periodically from the user's machine. All URLs are checked each time the tools run, with the possible exception of URL-minder, which runs on an Internet server and checks pages with an arbitrary frequency that is guaranteed to be at least as often as some threshold, such as a week (URL-minder's implementation is hidden behind a CGI interface).

The tools described above poll every URL with the same frequency. The w3new was modified to make it more scalable, as well as to integrate it with the other components of NO HANDS. W3newer runs on the user's machine, but it omits checks of pages already known to be modified since the user last saw the page, and pages that have been viewed by the user within some threshold. The time when the user has viewed the page comes from the W~browser's history.[1] The "known modification date" comes from a variety of sources:

a cached modification date from previous runs of w3newer;

a modification date stored in a proxy-caching server's cache; or the HEAD information provided by httpd (the HTTP server) for the URL.

If either of the first two sources of the modification date indicate that the page has not been visited since it was modified, then HTFP is used only if the time the modification information was obtained was long enough ago to be considered "stale" (currently, the threshold is one week).

In addition, there is a threshold associated with each page to determine the maximum frequency of direct HEAD requests. If the page was visited within the threshold, or the modification date obtained from the proxy-caching server is current with respect to the threshold, the page is not checked. The threshold can vary depending on the URL, with perl pattern matching used to determine what threshold to apply. The first matching pattern is used. Table 1 gives an example of a w3newer thresholds configuration file. Thresholds are specified as combinations of days (d) and hours (h), with 0 indicating that a page should be checked on every run of w3newer and never indicating that it should never be checked.

TABLE 1

An example of the thresholds specified to w3newer.

| | |
|---|---|
| # Comments start with a sharp sign. | |
| # perl syntax requires that "." be escaped | |
| # Default is equivalent to ending the file with ".*" | |
| Default | 2 d |
| file:.* | 0 |
| http://www\.yahoo\.com/.* | 7 d |
| http:www\.research\.att\com/.* | 0 |
| http://.*\.att\.com/.* | 1 h |
| http://home\.mcom\.com/honse/whatsnew/-whats_new\.html | 12 h |
| http://www\.ncsa\.uiuc\.edu/SDG/Software/-Mosaic/ Docs/whats-new\ html | 12 h |
| http://snapple\.cs\.washington\.edu:600/-mobile/ | 1 d |
| # rarely modified | |
| http://www\.cs\.duke\.edu/^pk/-HomePage\.html | 7 d |
| # this is in my hotlist but will be different every day | |
| http: //www\.unitedmedia\.com/-comics/dilbert/ | never |

Determining when HTTP pages have changed is analogous to caching a file in a distributed file system and determining when the file has been modified. While file systems such as the Andrew File System in "J. Howard et al.

Scale and performance in a distributed file system. ACM Transactions on Computer Systems, 6(1):51–81, February 1988"; and Sprite in "M. Nelson, B. Welch, and J. Ousterhout. Caching in the Sprite network file system. ACM Transactions on Computer Systems, 6(1):134–154, February 1988" provide guarantees of cache consistency by issuing call-backs to hosts with invalid copies, HTTP access is closer to the traditional NFS approach as shown in "R. Sandberg, D. Goldberg, S. Kleiman, D. Walsh, and B. Lyon. Design and implementation of the Sun network filesystem. In Proceedings of the USENIX 1985 Summer Conference, pages 119–130, June 1985", in which clients check back with servers periodically for each file they access. Netscape can be configured to check the modification date of a cached page each time it is visited, once each session, or not at all. Caching servers check when a client forces a full reload, or after a time-to-live value expires.

Here the problem is complicated by the target environment: one wishes to know not only when a currently viewed page has changes, but also when a page that has not been seen in a while has changed. Fortunately, unlike with file systems, HTTP data can usually tolerate some inconsistency. In the case of pages that are of interest to a user but have not been seen recently, finding out within some reasonable period of time, such as a day or a week, will usually suffice. Even if servers had a mechanism to notify all interested parties when a page has changed. immediate notification might not be worth the overhead.

Instead, one could envision using something like the Harvest replication and caching services a shown in "C. Mic Bowman et al. Harvest: A scalable, customizable discovery and access system. Technical Report CU-CS-732-94, Dept. of Computer Science, University of Colorado-Boulder, March 1995", to notify interested parties in a lazy fashion. A user who expresses an interest in a page, or a browser that is currently caching a page could register an interest in the page with its local caching service. The caching service would in turn register an interest with an Internet-wide, distributed service that would make a best effort to notify the caching service of changes in a timely fashion. (This service could potentially archive versions of HTTP pages as well). Pages would already be replicated, with server load distributed, and the mechanism for discovering when a page changes could be left to a negotiation between the distributed repository and the content provider: either the content provider notifies the repository of changes, or the repository polls it periodically. Either way, there would not be a large number of clients polling each interesting HTTP server. Moving intelligence about HTTP caching to the server has been proposed by James S. Gwertzman and Margo Seltzer in "The case for geographical push-caching. In Proceedings of the Fifth Workshop in Hot Topics in Operating Systems (HOTOS-V), pages 51–55, Orcas Island, Wash., May 1995. IEEE" and others.

One could also envision integrating the functionality of NO HANDS into file systems. Tools that can take actions when arbitrary files change are not widely available, though they do exist as in "Sun Mlicrosystems. The HotJava Browser: A White Paper Available as http://java.sun.com/ 1.0alpha3/doc/overview/hotjava/browser.whitepapers.ps". Users might like to have a unified report of new files and $W^3$ pages, and w3newer supports the "file:" specification and can find out if a local file has changed. However, snapshot has no way to access a file on the user's (remote) file system. Moving functionality into the browser would allow individual users to take snapshots of files that are not already under the control of a versioning system such as the Revision Control System (RCS) as shown in "W. Tichy. RCS: a system for version control. Software-Practice & Experience. 15(7):637–654, July 1985"; this might be an appropriate use of a browser with client-side execution, such as HotJava in "Sun Microsystems. The HotJava Browser: A White Paper Available as http://java.sun.com/ 1.0alpha3/doc/overview/hotjava/browser.whitepapers.ps".

When a periodic task checks the status of a large number of URLs, a number of things can go wrong. Local problems such as network connectivity or the status of a proxy-caching server can cause all HTTP requests to fail. Proxy-caching servers are sometimes overloaded to the point of timing out large numbers of requests, and a background task that retrieves many URLs in a short time can aggravate their condition. W3newer should therefore be able to detect cases when it should abort and try again later (preferably in time for the user to see an updated report).

At the same time, a number of errors can arise with individual URLs. They can move, with or without leaving a forwarding pointer. The server for a URL can be deactivated or renamed. They may disallow retrieval by "robots," meaning that any program that follows the "robot exclusion protocol A standard for robot exclusion. http//web.nexor.co.uk/mak/doc/robots/norobots.html" will not retrieve them. Since the cost of retrieving modification dates is small in comparison to the cost of retrieving robots.txt (part of the exclusion protocol), it may well be appropriate to ignore the robot exclusion protocol for this task, or to check robots.txt only occasionally on each host. Observing the protocol will still be advisable for hosts on which many URLs are checked, especially if the pages' contents are retrieved each time.

Finally, automatic detection of modifications based on information such as modification date and checksum can lead to the generation of "junk mail" as "noisy" modifications trigger change notifications. For instance, pages that report the number of times they have been accessed, or embed the current time, will look different every time they are retrieved.

W3newer attempts to address these issues by the following steps:

If a URL is inaccessible to robots, that fact is cached so the page is not accessed again unless a special flag is set when the script is invoked.

Another flag can tell w3newer to treat error conditions as a successful check as far as the URL's times-tamp goes. For instance, if w3newer runs daily and checks a particular URL every four days, normally an error accessing the page on Monday will cause it to be checked again on Tuesday. With this flag, it would be checked again on Friday. In general, it seems that errors are likely to be transient, and checking the next time w3newer is run would be reasonable.

When a URL is inaccessible, an error message appears in the status report, so the user can take action to remove a URL that no longer exists or repeatedly hits errors.

In addition, w3newer could be modified to keep a running counter of the number of times an error is encountered for a particular URL, or to skip subsequent URLs for a host if a host or network error (such as "timeout" or "network unreachable") has already occurred. Addressing the problem of "noisy" modifications will require heuristics to examine the differences at a semantic level.

In addition to providing a mechanism for determining when $W^2$ pages have been modified, there must be a way to access multiple versions of a page for the purposes of comparison.

There are three possible approaches for providing versioning of $W^3$ pages: making each content provider keep a history of all versions, making each user keep this history, or storing the version histories on an external server.

Server-Side Support Each server could store a history of its pages and provide a mechanism to use that history to produce marked-up pages that highlight changes. This method requires arbitrary content providers to provide versioning and differencing, so it is not practical, although it is desirable to support this feature when the content provider is willing.

Client-Side Support Each user could run a program that would store items in the hotlist locally, and run htmldiff against a locally saved copy. This method requires that every page of interest be saved by every user, which is unattractive as the number of pages in the average user's hotlist increases, and it also requires the ability to run htmldiff on every platform that runs a $W^3$ browser. Storing the pages referenced by the hotlist may not be too unreasonable, since programs like Netscape may cache pages locally anyway. There are other external tools such as warm list as shown in "Warmlist, http://glimpse.cs.arizona.edu:1994/paul/warmlist/" that provide this functionality.

External Service The approach is to run a service that is separate from both the content provider and the client. Pages can be registered with the service via an HTML form, and differences can be retrieved in the same fashion. Once a page is stored with the service, subsequent requests to remember the state of the page result in an RCS "check-in" operation that saves only the differences between the page and its previously checked-in version. Thus, except for pages that change in many respects at once, the storage overhead is minimal beyond the need to save a copy of the page in the first place.

Drawbacks to the "external service" approach are that the service must remember the state of every page that anyone who uses the service has indicated an interest in and must know which user has seen which version of each page. The first issue is primarily one of resource allocation, and is not expected to be a significant issue unless the service is used by a great many clients on a number of large pages. The second issue is addressed by using RCS's support for datestamps and requesting a page as it existed at a particular time. Alternatively, a version number could be retained for each <user,URL> combination.

Relative links become a problem when a page is moved away from the machine that originally provided it. If the source were passed along unmodified, then the $W^3$ browser would consider links to be relative to the CGI directory containing the snapshot script. HTML supports a BASE directive that makes relative links relative to a different URL, which mostly addresses this problem; however, Netscape 1.1 N treats internal links within such a document to be relative to the new BASE as well, which can cause the browser to jump between the htmldiff output and the original document unexpectedly.

The snapshot facility must address four important issues: use of CGI, synchronization, resource utilization, and security/privacy.

CGI is a problem because there is no way for snapshot to interact with the user and the user's browser, other than by sending HTML output. When a CGI script is invoked, httpd sets up a default timeout, and if the script does not generate output for a full timeout interval, httpd will return an error to the browser. This was a problem for snapshot because the script might have to retrieve a page over the Internet and then do a time-consuming comparison against an archived version. The server does not tell snapshot what a reasonable timeout interval might be for any subsequent retrievals; instead this is hard-coded into the script. In order to keep the HTTP connection alive, snapshot forks a child process that generates one space character (ignored by the $W^3$ browser) every several seconds while the parent is retrieving a page or executing htmldiff.

Synchronization between simultaneous users of the facility is complicated by the use of multiple files for bookkeeping. The system must synchronize access to the RCS repository, the locally cached copy of the HTML document, and the control files that record which version of each page a user has seen. Currently this is done by using UNIX file locking on both a per-URL lock file and the per-user control file. Ideally the locks could be queued such that if multiple users request the same page simultaneously, the second snapshot process would just wait for the page and then return, rather than repeating the work. This is not so important for making snapshots, in which case a proxy-caching server can respond to the second request quickly and RCS can easily determine that nothing has changed, but there is no reason to run htmldiff twice on the same data.

The latter point relates to the general issue of resource utilization. Snapshot has the potential to use large amounts of both processing and disk space. The need to execute htmldiff on the server can result in high processor loads if the facility is heavily used. These loads can be alleviated by caching the output of htmldiff for a while, so many users who have seen version N and N+1 of a page could retrieve htmldiff(page$_N$,page$_{N+1}$) with a single invocation of htmldiff. The facility could also impose a limit on the number of simultaneous users, or replicate itself among multiple computers, as many $W^3$ services do.

Disk space is potentially a problem if the repository can grow without bound and with no cost to its users. In fact, before a service like this could be placed on the Internet, it would have to authenticate each user and limit the user to a fixed number of URLs and/or disk blocks. Most likely, one would use an Internet commerce facility to charge a fee in exchange for permission to store a collection of URLs: this fee could easily offset the cost of the storage medium since it would also be paying for the differencing service.

Lastly, security and privacy are important. Because the CGI scripts run with minimal privileges, from an account to which many people have access, the data in the repository is vulnerable to any CGI script and any user with access to the CGI area. Data in this repository can be browsed, altered, or deleted. In order to use the facility one must give an identifier (currently one's email address, which anyone can specify) that is used subsequently to compare version numbers. Browsing the repository can therefore indicate which user has an interest in which page, how often the user has saved a new checkpoint, and so on.

By moving to an authenticated system on a secure machine, one could break some of these connections and obscure individuals' activities while providing better security. The repository would associate impersonal account identifiers with a set of URLs and version numbers, and passwords would be needed to access one of these accounts. Whoever administers this facility, however, will still have information about which user accesses which pages, unless the account creation can be done anonymously.

So far, only a small fraction of pages on the $W^3$ contain information that allows users to ascertain how the pages have changed-examples include icons that highlight recent additions, a link to a "changelog", or a special "whats new" page. As was mentioned in the introduction, these approaches suffer from deficiencies. They are intended to be viewed by all users, but users will visit the pages at different intervals and have different ideas of "what's new". In addition, the maintainer must explicitly generate the list of recent changes, usually by manually marking up the HTML.

Automatic comparison of HTML pages and generation of marked-up pages frees the HTML provider from having to determine what's new and creating new or modified HTML pages to point to the differences. There are many ways to compare documents and many ways to present the results.

HTML separates content (raw text) from markups. While many markups (such as <P>, <I>, and <HR>) simply change the formatting and presentation of the raw text, certain markups such as images (<IMG src= . . . >) and hypertext references (<A href= . . . >) are "content-defining." Whitespace in a document does not provide any content (except perhaps inside a <PRE>), and should not impact comparison.

At one extreme, one can view an HTML document as merely a sequence of words and "content-defining" markups. Markups that are not "content-defining" as well as whitespace are ignored for the purposes of comparison. The fact that the text inside <P> . . . </P> is logically grouped together as a paragraph is lost. As a result, if one took the text of a paragraph comprised of four sentences and turned it into a list (<UL>) of four sentences (each starting with <LI>), no difference would be flagged because the content matches exactly.

At the other extreme, one can view HTML as a hierarchical document and compare the parse tree or abstract syntax tree representations of the documents, using sub-tree equality (or some weaker measure) as a basis for comparison. In this case, a subtree representing a paragraph (<P> . . . </P>) might be incomparable with a subtree representing a list (<UL> . . . </UL>). The example of replacing a paragraph with a list would be flagged as both a content and format change.

An HTML document is viewed as a sequence of sentences and "sentence-breaking" markups (such as <P>, <HR>, <LI>, or <H1>) where a "sentence" is a sequence of words and certain (non-sentence-breaking) markups (such as <B> or <A>). A "sentence" contains at most one English sentence, but may be a fragment of an English sentence. All markups are represented and are compared, regardless of whether or not those markups are "content-defining." In the paragraph-to-list example, the comparison would show no change to content, but a change to the formatting.

Hirshberg's solution is applied to the longest common subsequence (LCS) problem as shown in "D. S. Hirschberg. A linear space algorithm for computing maximal common subsequences. Communications of the ACM, 18(6):34t–343, June 1975" and in "D. S. Hirschberg. Algorithms for the longest common subsequence problem. Journal of the ACM, 24(4):664–675, October 1977",(with several speed optimizations) to compare HTML documents. This is the well-known comparison algorithm used by the Unix difficulty in "J. W. Hunt and M. D. McIlroy. An algorithm for differential file comparison. Technical Report Computing Science TR#41, Bell Laboratories, Murray Hill, N. J., 1975". The LCS problem is to find a (not necessarily contiguous) common subsequence of two sequences of tokens that has the longest length (or greatest weight). Tokens not in the LCS represent changes. In Unix diff a token is a textual line and each line has weight equal to 1. In htmldiff a token is either a sentence-breaking markup or a sentence, which consists of a sequence of words and non-sentence-breaking markups. Note that the definition of sentence is not recursive; sentences cannot contain sentences. A simple lexical analysis of an HTML document creates the token sequence and converts the case of the markup name and associated (variable,value) pairs to uppercase; parsing is not required.

It is now described how the weighted LCS algorithm compares two tokens and computes a non-negative weight reflecting the degree to which they match (a weight of 0 denotes no match). Sentence-breaking markups can only match sentence-breaking markups. They must be identical (modulo whitespace, case, and reordering of (variable,value) pairs) in order to match. A match has weight equal to 1. Sentences can match only sentences, but sentences need not be identical to match one another. Two steps are used to determine whether or not two sentences match. The first step uses sentence length as a comparison metric. Sentence length is defined to be the number of words and "content-defining" markups such as <IMG> or <A> in a sentence. Markups such as <B> or <I> are not counted. If the lengths of two sentences are not "sufficiently close," then they do not match. Otherwise, the second step computes the LCS of the two sentences (where words matching exactly against words are assigned weight 1, and markups match exactly against markups, as before). Let W be the number of words and content-defining markups in the LCS of the two sentences and let L be the sum of the lengths of the two sentences. If the percentage (2* W)/L is sufficiently large, then the sentences match with weight W. Otherwise, they do not match.

The comparison algorithm outlined above yields a mapping from the tokens of the old document to the tokens of the new document. Tokens that have a mapping are termed "common"; tokens that are in the old (new) document but have no counterpart in the new (old) are "old" ("new"). "old" and "new" tokens are referred to as "differences". Below are listed and described the three basic ways to present the differences by creating HTML documents that highlight the differences with a variety of markup techniques:

Side-by-Side A side-by-side presentation of the documents with common text vertically synchronized is a very popular and pleasing way to display the differences between documents (see, for example, Unix sdiff or SGI's graphical diff tool gdiff Unfortunately, there is no good mechanism in place with current 1-ITMIL and browser technology that allows such synchronization (although it might be possible to make a document that contained a table with a document per column in which rows of the table were used to achieve synchronization).

Only Differences Show only differences (old and new) and eliminate the common part (as done in Unix diff). This optimizes for the "common" case, where there is much in common between the documents. This is especially useful for very large documents but can be confusing because of the loss of surrounding common context. Another problem with this approach is that an HTML document comprised of an interleaving of old and new fragments might be syntactically incorrect.

Merged-Page Create an HTML page that summarizes all of the common, new, and old material. This has the advantage that the common material is displayed just once (unlike the side-by-side presentation). However, incorporating two pages into one again raises the danger of creating syntactically or semantically incorrect HTML. (consider converting a list of items into a table, for example).

The preference is to present the differences in the merged-page format to provide context and use internal hypertext references to link the differences together in a chain so the user can quickly jump from difference to difference. The syntactic/semantic problem of merging is currently dealt by eliminating all old markups from the merged page (note that this doesn't mean all markups in the older document, just the ones classified as "old" by the comparison algorithm). As a result, old hypertext references and images do not appear in the merged page (of course, since they were deleted they may not be accessible anyway). However, by reversing the sense of "old" and "new" one can create a merged page with the old markups intact and the new deleted. A more Draconian option would be to leave out all old material. In this case, there are no syntactic problems given that the most recent page is syntactically correct to begin with; the merged page is simply the most recent page plus some markups to point to the new material. Other ways to create a merged page is being explored.

An example of htlmdiff's merged-page output appears in FIG. 1. Markups are used to highlight old and new material as follows. Two small arrow images are used to point to areas in the document that have changed. A red arrow points to old content and a green arrow points to new content. The arrows are also internal hypertext references to one another, linked in a chain to allow quick traversal of the differences. A banner at the front of the document contains a link to the first difference. Old text is displayed in "struck-out" font using <STRIKE>, which is rarely used in HTML found on the $W^3$. Unfortunately, there is no ideal font for showing "new" text. Currently <STRONG><I> is used. Ideally, it would be desirable to color code the text or text background to highlight old and new text, but this capability is not provided by current browsers. Another approach would be to choose a font that is not active at the point of the difference.

Note that not all changes in the documents are highlighted. For example, new markups that are not "content-defining" (such as <P>) are not marked up. However, markups such as anchors are highlighted. Consider the example of changing the URL in an anchor but not the content surrounded by <A> . . . </A>. In this case, an arrow will point to the text of the anchor, but the text itself will be in its original font, signifying a change to just the URL.

Since htmldiff can parse an HTML document and rectify certain syntactic problems, such as mismatched or missing markups, the only real problem it is likely to encounter is a set of changes that are so pervasive as to make the resulting merged HTML unreadable. For instance, if every other line were changed, then the mixture of unrelated struck-out and emphasized text would be muddled. The experimenting with methods is being done for varying the degree to which old and new text can be interspersed, as well as thresholds to specify when the changes are too numerous to display meaningfully.

Currently, htmldiff is neither "version-aware" nor "webware". That is, htmldiff only compares the text of two HTML pages. It does not compare versions of the entities that the pages refer to, access them, or invoke itself recursively on other referenced pages. This has a number of consequences. The good news is that htmldiff does not incur the overhead of pulling versions from a repository or sending requests over the $W^3$ for information. This cost is consumed by w3newer and snapshot. The bad news is that some differences may be ignored. For example, if the contents of an image file are changed but the URL of the file does not, then the URL in the page will not be flagged as changed. To support such comparison would require some sort of versioning of referenced entities and would also require htmdiff to have access to the version repositories.

Full versioning of all entities would allow interesting comparisons to be done, but would dramatically increase storage requirements. A cheaper alternative would be to store a checksum of each entity and use the checksums to determine if something has changed. It is being explored on how to efficiently perform such "smarter" comparisons.

There are two entry points to NO HANDS, one through w3newer and one through snapshot. Currently, w3newer is invoked directly by the user, probably by a crontab entry, and generates an HTML document indicating which pages have changed. If specified, w3newer will associate three links with each document in the hotlist:

Remember Send the URL to the snapshot facility, to save a copy of the page. Though the page is retrieved, the RCS ci command ensures that it is not saved if it is unchanged from the previous time it was stored away.

Diff Have the snapshot facility invoke htmldiff to display the changes in a page since it was last saved away by the user.

History Have snapshot display a full log of versions of this page, with the ability to run htmldiff on any pair of versions or to view a particular version directly. (See FIG. 2.)

Thus, each page that is reported as "new" can immediately be passed to htmldiff, and any page in the list can be "remembered" for future use. An example of w3newer's output appears in FIG. 3.

A user may also choose to enter snapshot directly to check-in pages, or view the current page or the version history. FIG. 4 shows the interface to NO HANDS through snapshot If the user selects the history link, the page shown in FIG. 2 is presented. Finally, selecting two pages to compare invokes htmldiff as in FIG. 1.

One disadvantage of the current approach is that there is no direct interaction between w3newer, snapshot, and the $W^3$ browser. Viewing a page with htmldiff does not cause the browser to record that the page has just been seen; instead, the browser records the URL that was used to invoke htmldiff in the first place. Subsequently, w3newer uses the obsolete datestamp from the browser and continues to report that the page has been modified more recently than the browser has seen it. As a result, the user must view a page directly as well as via htmldiff in order to both remove it from the list of modified pages and see the actual differences.

This section describes some possible extensions to the work already presented. Section 6.1 discusses an interface between RCS and htmldiff that is already implemented, while Sections 6.2 and 6.3 presents unimplemented extensions to integrate tracking modifications into the server and to invoke scripts via the HTTP POST protocol.

The tools described above do not require any changes to arbitrary servers or clients on the $W^3$. Existing GET and POST protocols are used to communicate with specific servers that save versions of documents and provide marked-up versions showing how they have changed. However, if a server runs htmldiff and some perl scripts, it can provide a direct version-control interface and avoid the need to store copies of its HTML documents elsewhere.

The perl scripts so far written provide an interface to RCS as shown in "W. Tichy. RCS: a system for version control. Software-Practice & Experience. 15(7):637–654, July 1985". A CGI script (/cgi-bin/rlog) converts the output of rlog into HTML, showing the user a history of the document with links to view any specific version or to see the differences between two versions. Another script (/cgibin/co) displays a version of a document under RCS control, while still another (/cgi-bin/rcsdiff) displays the differences. If the file's name ends in html then htmldiff is used to display the differences, rather than the rcsdiff program.

As an example, one might set up a Last-Modified field at the bottom of an HTML document to be a link to the rlog script, with the document name specified as a parameter. After clicking on this unobtrusive field, the user would be able to see the history of the document.

Currently, w3newer runs on the user's machine, so multiple instantiations of the script may perform the same work. Although it runs a related daemon on the same machine as an AT&T-wide proxy-caching server, which returns information about pages that are currently cached on the server and may eliminate some accesses over the Internet, there is insufficient locality in that cache for it to eliminate a significant fraction of requests.

Alternatively, w3newer could be run on the set of pages that have been saved by the snapshot daemon. Regardless of how many users have registered an interest in a page, it need only be checked once: if changed, the new version could be saved automatically. Then a user could request a list of all pages that have been saved away, and get an indication of which pages have changed since they were saved by the user.

Adding this functionality would be useful, since it would offer economies of scale. It would have the disadvantage of being decoupled from a given user's $W^3$ browser history; i.e., if a user views a page directly, the snapshot facility would have no indication of this and might present the page as having been modified.

Because NO HANDS can handle arbitrary URLs, it can interact with CGI scripts that use the GET protocol by passing arguments to the script as part of the URL. However, services that use POST cannot be accessed, because the input to the services is not stored.

Both w3newer and snapshot would have to be modified to support the POST protocol, in order to invoke a service and see if the result has changed, and then to store away the result and display the changes if it has. The interface to NO HANDS to support POST is unclear, however. A user could manually save the source to an HTML form and change the URL the form invokes to be something provided by NO HANDS. It, in turn, would have to make a copy of its input to pass along to the actual service. The result would be en HTTP equivalent of a UNIX pipe, interposing an extra service between the browser and the service the user is trying to invoke.

Instead, the browser could be modified to have better support for forms:

It should store the filled-out version of a form in its bookmark file, so the user could jump directly to the output of a CCI script.

It should be able to pass a form directly to NO HANDS, along with the URL specified in the FORM tag, so that the output could be stored under RCS.

NO HANDS combines notification, archiving, and differencing of $W^3$ pages into a single cohesive tool. It achieves economies of scale by avoiding unnecessary HTTP accesses, saving pages at most once each time they are modified (regardless of the number of users who track it). and using RCS as the underlying versioning system. Automatic generation of differences within the HTML framework provides users with the ability to see both insertions and deletions in a convenient fashion.

In the general setting of the $W^3$ and document retrieval NO HANDS benefits two communities: users of the no longer have to browse to find pages of interest that have changed; HTML providers no longer have to create suitably marked-up pages to show "what's new". While such automation is clearly helpful in this general context, it is expected that NO HANDS will be a critical part of more focused uses of the $W^3$, especially in areas involving collaborative and distributed work.

Several issues still need to be addressed. In particular, many of the complications of NO HANDS could be avoided by better integration with $W^3$ browsers and servers. For instance, viewing the difference between an older version of a page and its current version should update the browser's notion of when the page was last visited. Finally, the increasing availability of distributed, hierarchical HTTP repositories such as shown in "C. Mic Bowman et al. Harvest: A scalable, customizable discovery and access system. Technical Report CU-CS-732-94, Dept. of Computer Science, University of Colorado-Boulder, March 1995", will be both an opportunity and a challenge for scalable notification mechanisms and version archives.

Numerous substitutions and modifications can be undertaken without departing from the true spirit and scope of the invention. What is desired to be secured by Letters Patent is the invention as defined in the following claims:

What is claimed is:

1. A method for monitoring changes in documents stored on the World Wide Web, comprising the steps of:

(a) copying a first document selected by a first user from the World Wide Web to create a first copied archived document on a server separate from the World Wide Web and under independent control;

(b) monitoring for the changes in the first selected document;

(c) archiving, on the separate server, the changes in the first selected document, as detected during such monitoring;

(d) storing various versions of the first selected document on the separate server;

(e) presenting to the first user, a current version of the first document as archived, and an option to compare selected versions, as archived;

(f) receiving a second document selected by a second user from the World Wide Web;

(g) comparing the first copied document with the second selected document, and if the first copied document is same as the second selected document, follow step (h) below, otherwise follow steps (i) through (l) below;

(h) presenting to the second user, a current version of the first document as archived, and an option to compare selected versions, as archived;

(i) copying the second document selected by the second user from the World Wide Web to create a second copied archived document on a server separate from the World Wide Web and under independent control;

(j) monitoring the changes in the second selected document;

(k) archiving, on the separate server, the changes in the second selected document, as detected during such monitoring;

(l) presenting to the second user, a current version of the second document as archived, and an option to compare selected versions, as archived.

2. The method of claim 1, further comprising the step of:
recording the times when the first and second user access each document.

3. The method of claim 1, further comprising the steps of:
comparing the current version of the first selected document as archived with the first copied document
comparing the current version of the second selected document as archived with the second copied document.

4. The method of claim 1, further comprising the step of:
notifying the first user, the changes in the first selected document as archived with the first copied document.
notifying the second user, the changes in the second selected document as archived with the second copied document.

5. The method of claim 4, wherein the first user is notified upon a specific request by the first user.

6. The method of claim 4, wherein the first user is notified by the first user's access to the first selected document.

7. The method of claim 4, wherein the second user is notified upon a specific request by the second user.

8. The method of claim 4, wherein the second user is notified by the second user's access to the second selected document.

9. The method of claim 4, wherein the first and second users are notified by the electronic mail message.

10. The method of claim 3, wherein the documents that are compared for any changes are determined by default.

11. The method of claim 3, wherein the documents that are compared for any changes are specified by the first and the second user.

* * * * *

UNITED STATES PATENT AND TRADEMARK OFFICE
CERTIFICATE OF CORRECTION

PATENT NO.    : 6,596,030 B2
DATED         : July 22, 2003
INVENTOR(S)   : Thomas J. Ball and Frederick Douglis It is certified that error appears in the above-identified patent and that said Letters Patent is hereby corrected as shown below:

<u>Title page, Item [54] and Column 1, lines 1 and 2,</u>
Title, "IDENTIFYING CHANGES IN ON-LINE DATA REPOSITORIES" changed to -- METHOD AND APPARATUS FOR TRACKING AND VIEWING CHANGES ON THE WEB --

Signed and Sealed this

Second Day of December, 2003

JAMES E. ROGAN
*Director of the United States Patent and Trademark Office*